(12) United States Patent
    Takai

(10) Patent No.: US 11,858,753 B2
(45) Date of Patent: Jan. 2, 2024

(54) INVERSION GUIDE DEVICE AND TOFU PRODUCTION DEVICE

(71) Applicant: TAKAI TOFU & SOYMILK EQUIPMENT CO., Ishikawa (JP)

(72) Inventor: Toichiro Takai, Ishikawa (JP)

(73) Assignee: TAKAI TOFU & SOYMILK EQUIPMENT CO., Ishikawa (JP)

( * ) Notice: Subject to any disclaimer, the term of this patent is extended or adjusted under 35 U.S.C. 154(b) by 0 days.

(21) Appl. No.: 17/758,766

(22) PCT Filed: Feb. 25, 2021

(86) PCT No.: PCT/JP2021/007180
    § 371 (c)(1),
    (2) Date: Jul. 13, 2022

(87) PCT Pub. No.: WO2021/172461
    PCT Pub. Date: Sep. 2, 2021

(65) Prior Publication Data
    US 2023/0067001 A1    Mar. 2, 2023

(30) Foreign Application Priority Data

Feb. 25, 2020  (JP) ................................. 2020-029789
Feb. 3, 2021   (JP) ................................. 2021-015922

(51) Int. Cl.
    *B65G 47/24*    (2006.01)
    *B65G 47/52*    (2006.01)
    (Continued)

(52) U.S. Cl.
    CPC ............. *B65G 47/52* (2013.01); *A23L 11/45* (2021.01); *B65B 55/08* (2013.01); *B65B 55/14* (2013.01); *B65G 47/252* (2013.01)

(58) Field of Classification Search
    CPC ...... B65G 47/52; B65G 47/252; B65G 47/24; B65G 47/248; B65B 55/14; B65B 55/18
    (Continued)

(56) References Cited

U.S. PATENT DOCUMENTS 4,067,433 A * 1/1978 Phipps ................. B65G 47/084
                                                  198/374
4,162,723 A * 7/1979 Kupper ................ B65G 17/002
                                                  198/465.1
(Continued)

FOREIGN PATENT DOCUMENTS

EP    3228565 A1   11/2017
JP    S61-000113 A  1/1986
(Continued)

OTHER PUBLICATIONS

International Search Report issued in PCT/JP2021/007180; dated Apr. 20, 2021.
(Continued)

*Primary Examiner* — Douglas A Hess
(74) *Attorney, Agent, or Firm* — Studebaker & Brackett PC

(57) ABSTRACT

An inversion guide device is configured to guide tofu conveyed by a transfer conveyor and inverted by a turn-back portion at one end of the transfer conveyor. The inversion guide device includes an endless conveyor configured to support the tofu along a track of the turn-back portion and guide the tofu while being driven in a circulating manner.

19 Claims, 33 Drawing Sheets

(51) Int. Cl.
*A23L 11/45* (2021.01)
*B65B 55/14* (2006.01)
*B65B 55/08* (2006.01)
*B65G 47/252* (2006.01)

(58) Field of Classification Search
USPC ............ 198/418.6, 626.3; 414/758, 759, 782
See application file for complete search history.

(56) References Cited

U.S. PATENT DOCUMENTS

| | | | | | |
|---|---|---|---|---|---|
| 4,947,981 | A | * | 8/1990 | Dorner | B65G 47/252 |
| | | | | | 198/463.3 |
| 5,249,607 | A | * | 10/1993 | Larsen | B65B 37/005 |
| | | | | | 141/168 |
| 6,217,274 | B1 | * | 4/2001 | Svyatsky | B65H 1/025 |
| | | | | | 198/408 |
| 6,234,891 | B1 | * | 5/2001 | Maria Klaassen ... | A22C 11/008 |
| | | | | | 198/418.6 |
| 6,527,100 | B2 | * | 3/2003 | Ballestrazzi | B65H 15/016 |
| | | | | | 414/773 |
| 6,669,004 | B1 | * | 12/2003 | Schoop | B65G 29/02 |
| | | | | | 198/465.1 |
| 7,175,017 | B2 | * | 2/2007 | Carey | B65G 13/12 |
| | | | | | 198/412 |
| 7,690,882 | B1 | * | 4/2010 | Sjostedt | B65H 45/107 |
| | | | | | 414/789.2 |
| 10,781,049 | B2 | * | 9/2020 | Christensen | B65G 17/065 |

FOREIGN PATENT DOCUMENTS

| | | |
|---|---|---|
| JP | S63-203516 A | 8/1988 |
| JP | H03-219850 A | 9/1991 |
| JP | S52-009264 A | 1/1997 |
| JP | 2000-037336 A | 2/2000 |
| JP | 2007-006759 A | 1/2007 |
| JP | 2009-208963 A | 9/2009 |
| JP | 3172221 U | 12/2011 |
| JP | 2017-186056 A | 10/2017 |
| JP | 2020-023380 A | 2/2020 |
| JP | 6639312 B2 | 2/2020 |

OTHER PUBLICATIONS

Written Opinion issued in PCT/JP2021/007180; dated Apr. 20, 2021.
An Office Action; "Notice of Reasons for Refusal," mailed by the Japanese Patent Office dated Jan. 4, 2023, which corresponds to Japanese Patent Application No. 2022-503714 and is related to U.S. Appl. No. 17/758,766; with English language translation.

* cited by examiner

FIG. 1
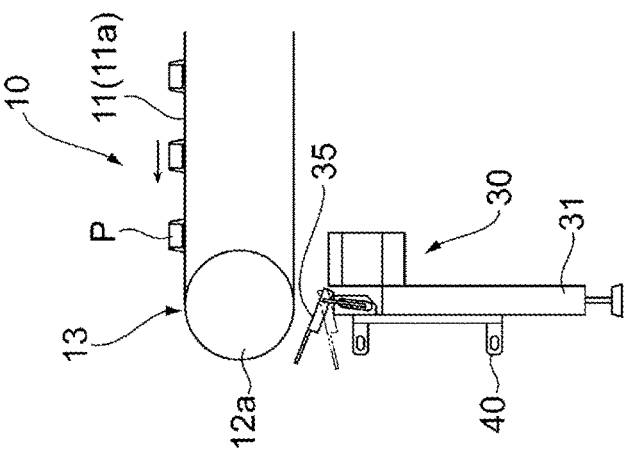
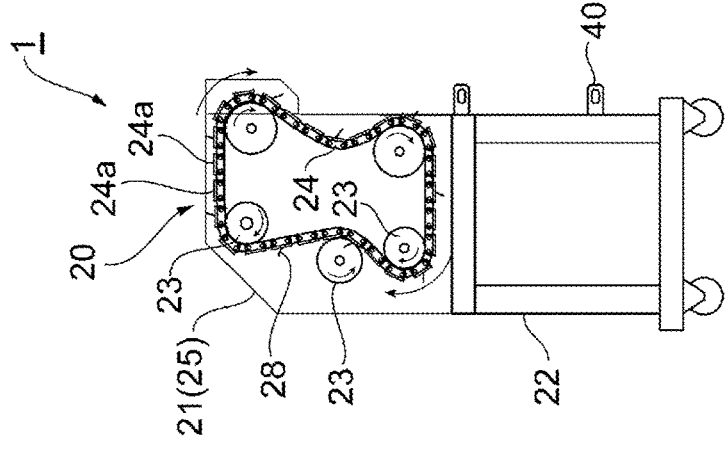
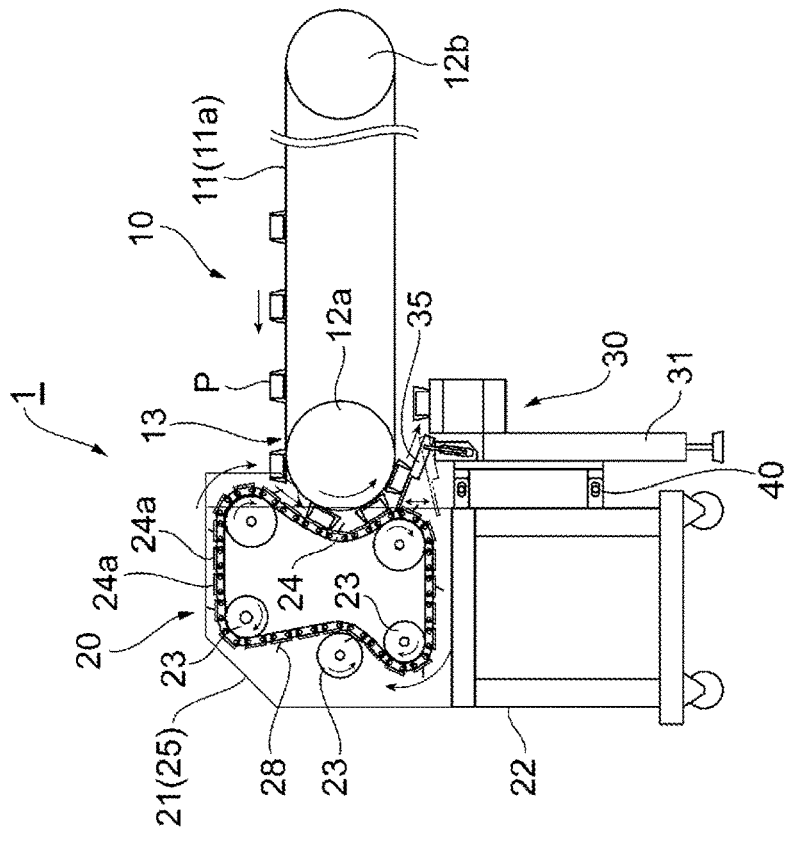

FIG. 4
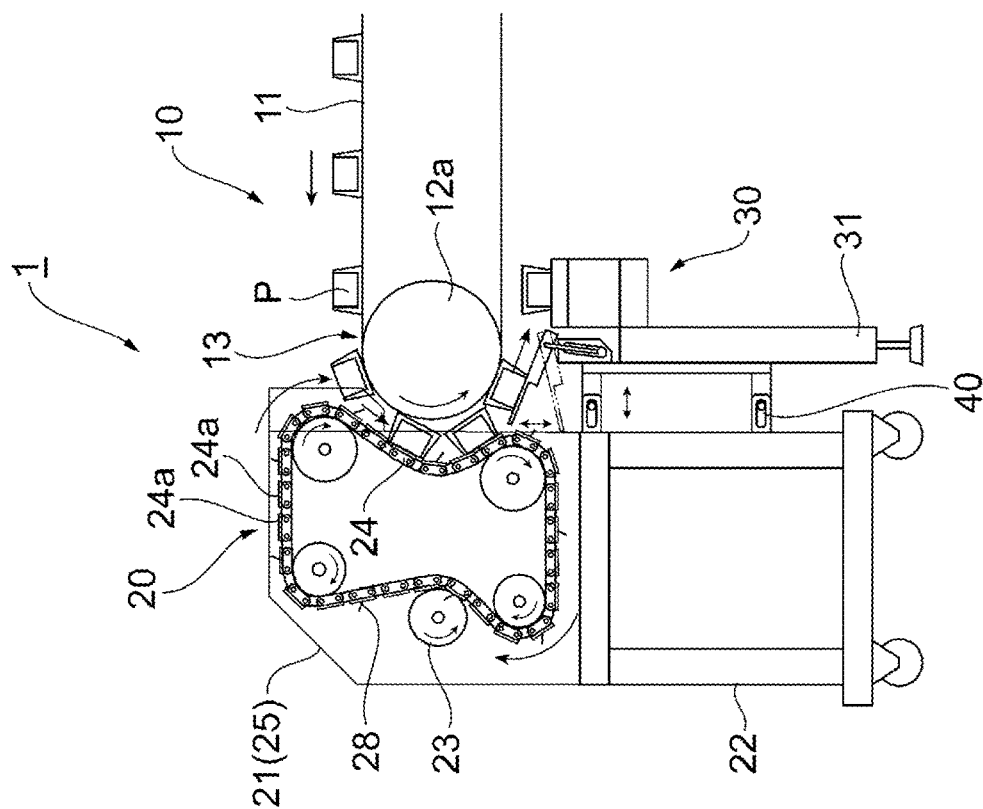
(a)
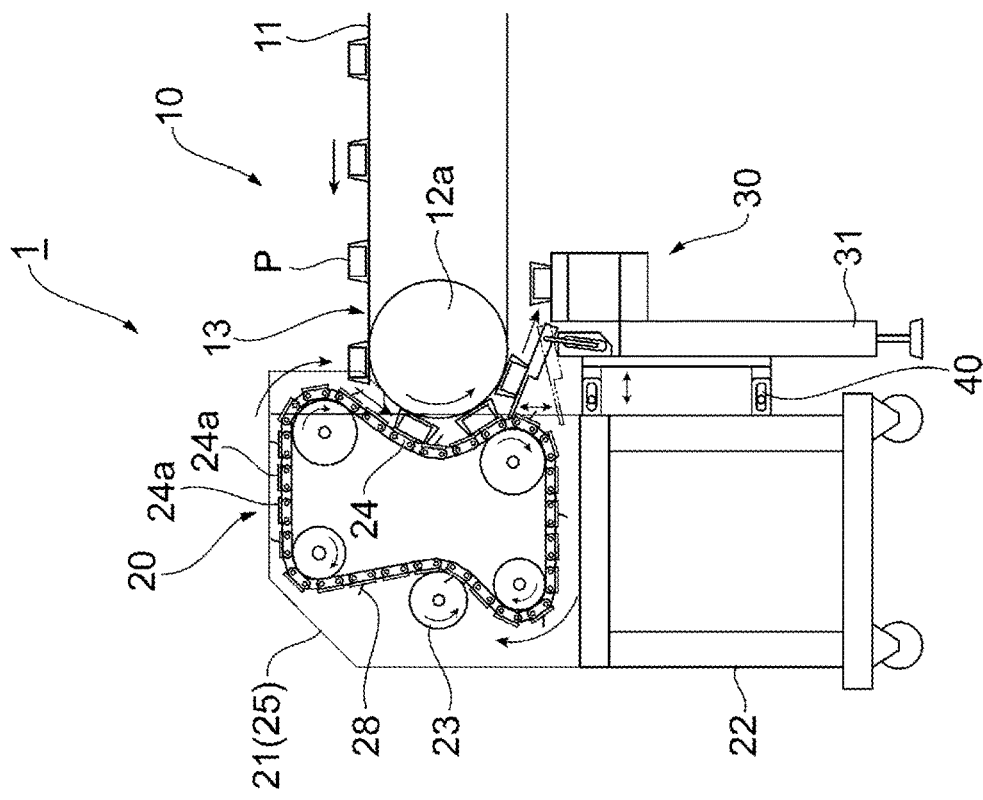
(b)

FIG. 5
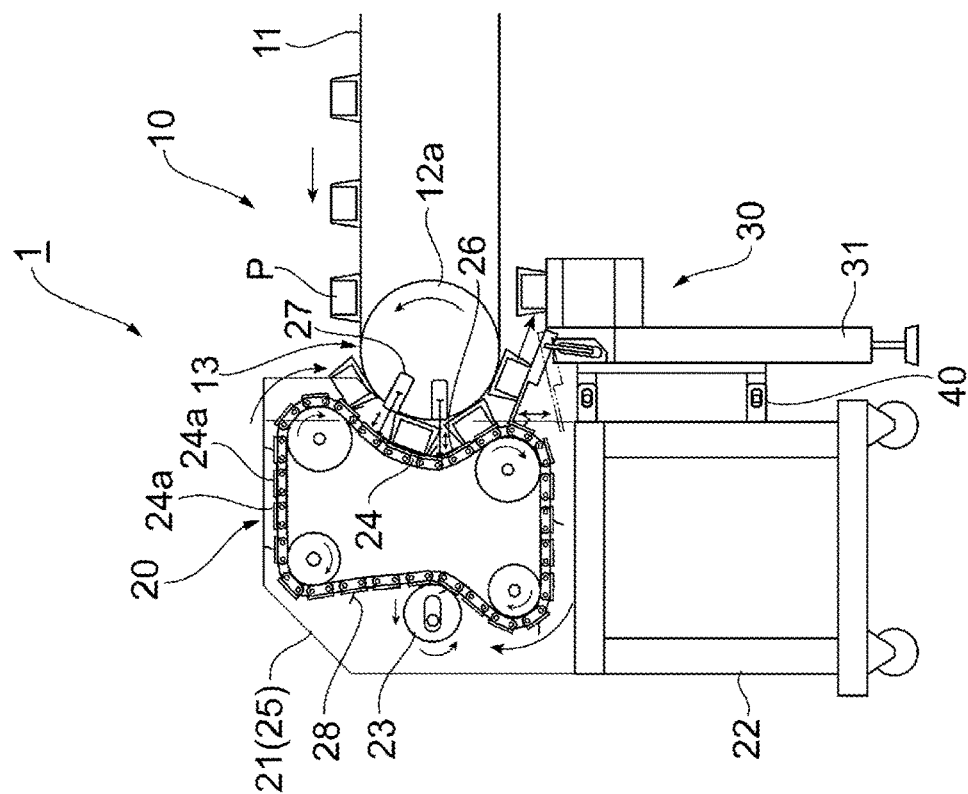
(a)
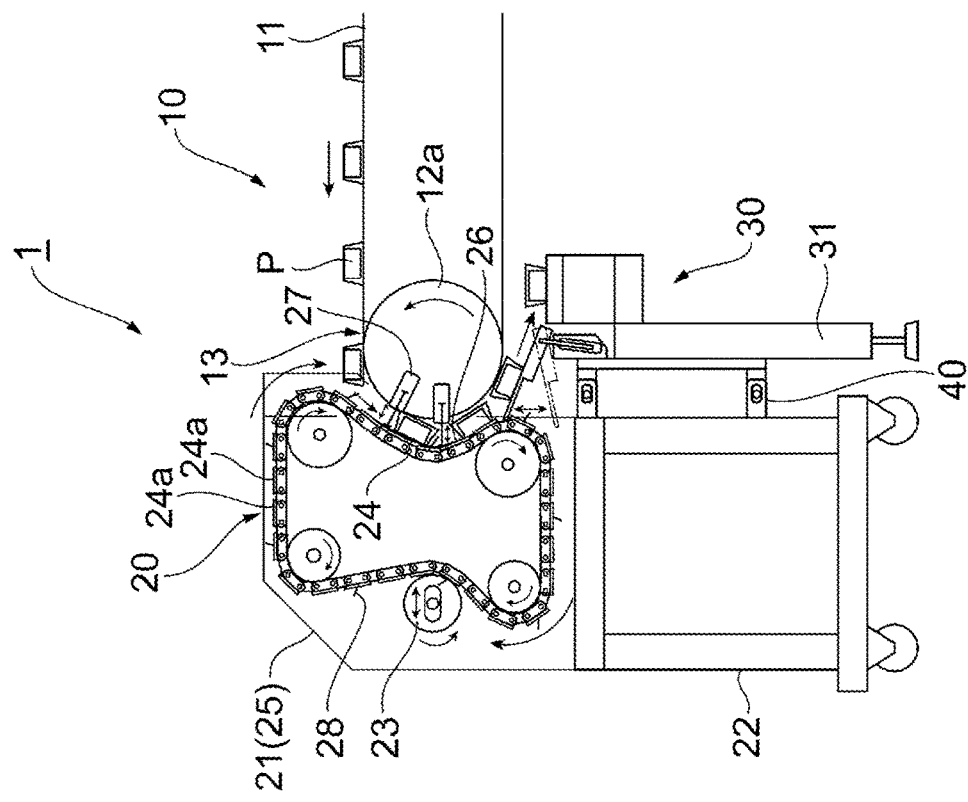
(b)

FIG. 8
(a)
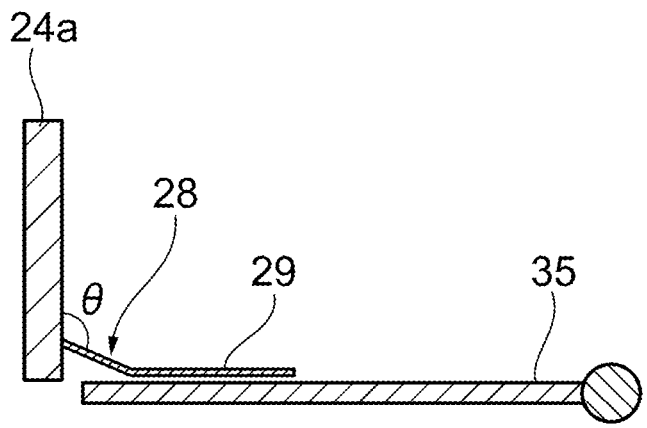
(b)
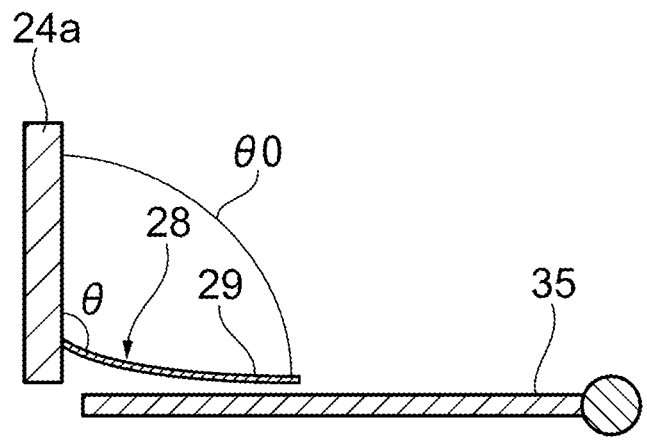
(c)
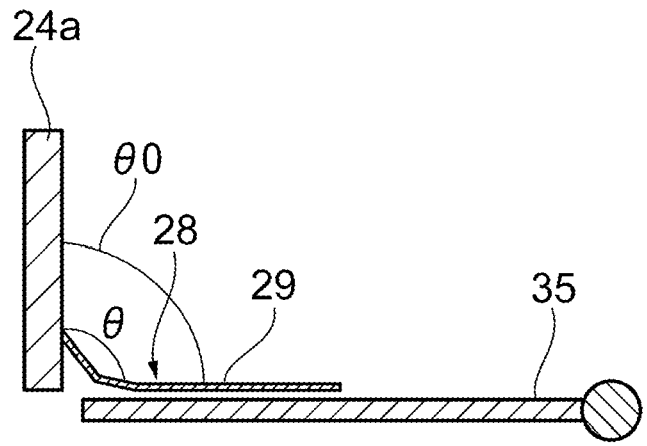

FIG. 9
(a) 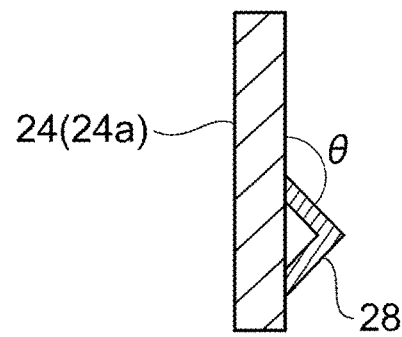
(b) 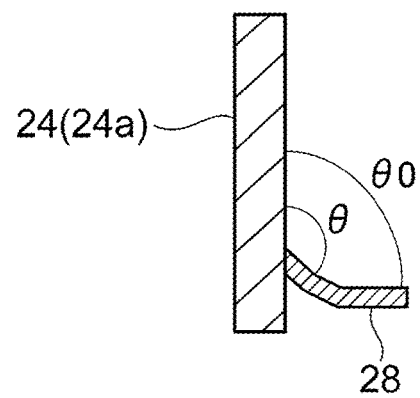
(c) 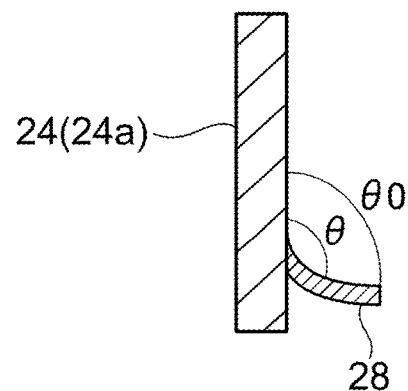
(d) 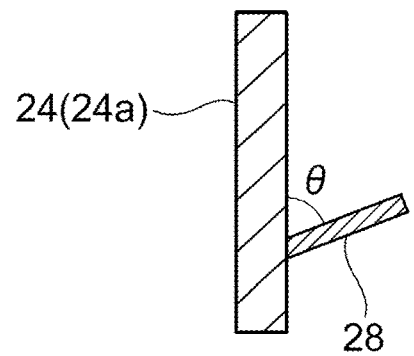

FIG. 14
(a)
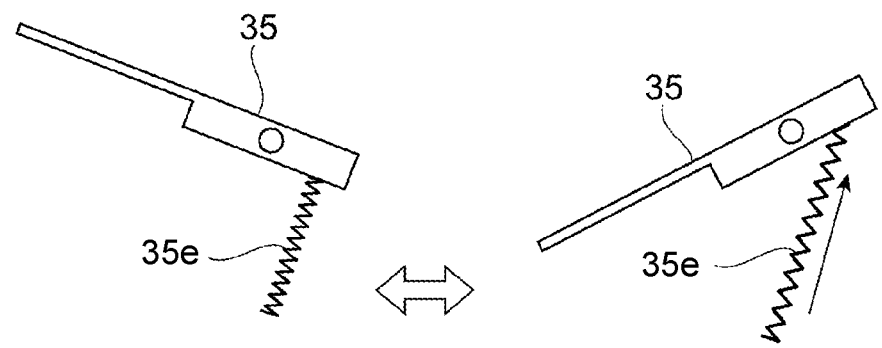
(b)
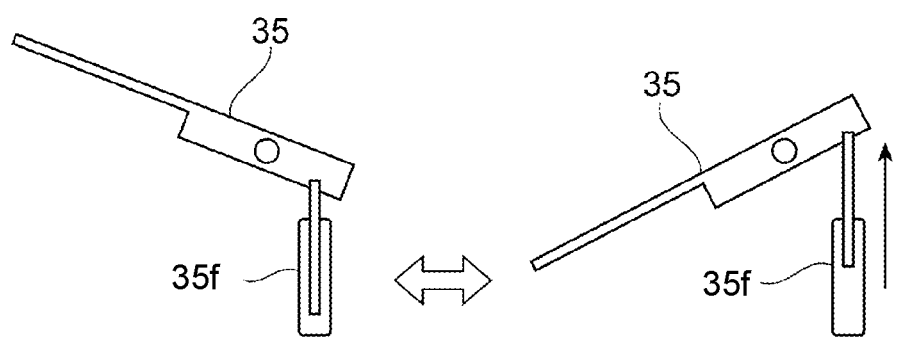
(c)
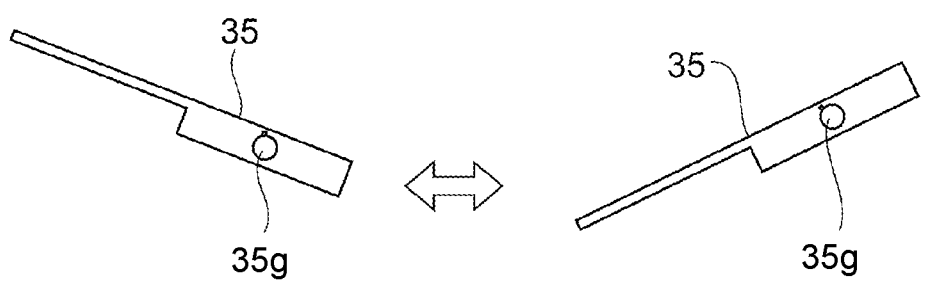

FIG. 17
(a)
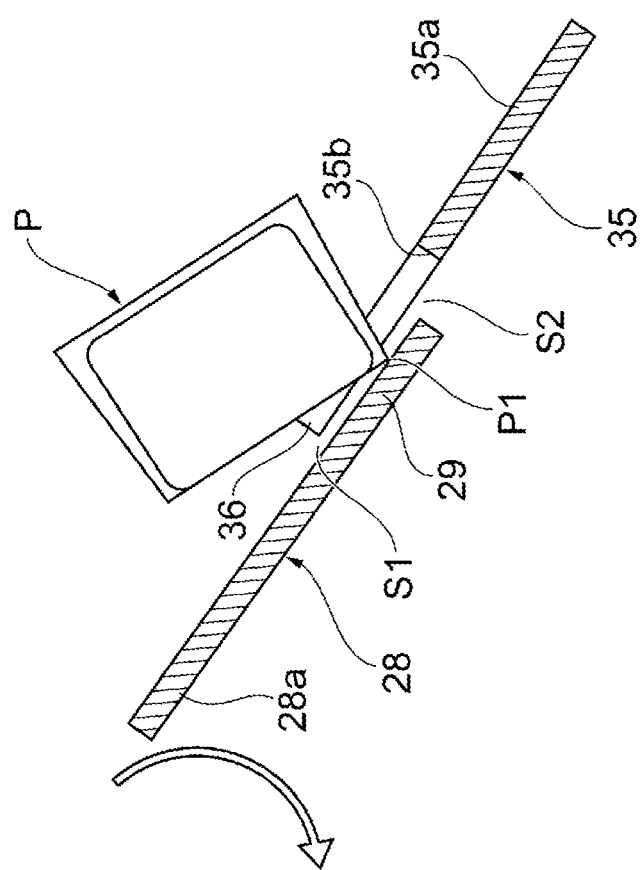
(b)
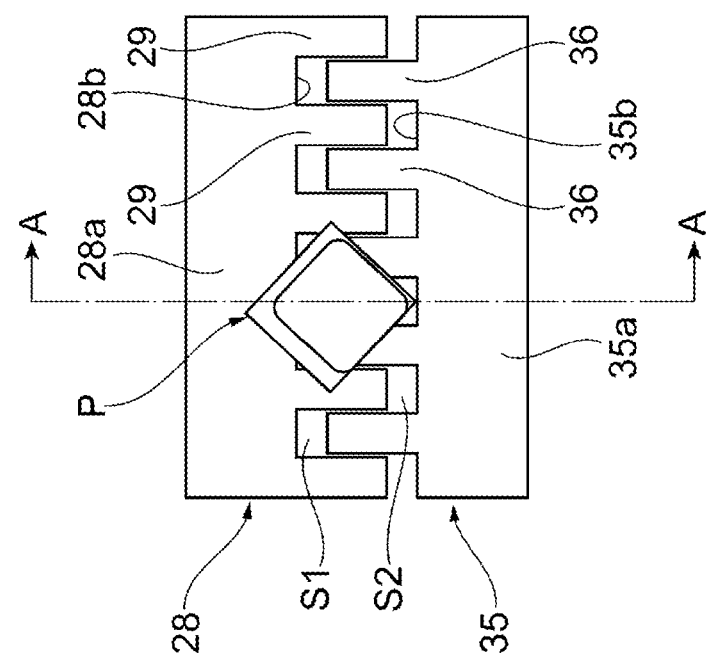

FIG. 18
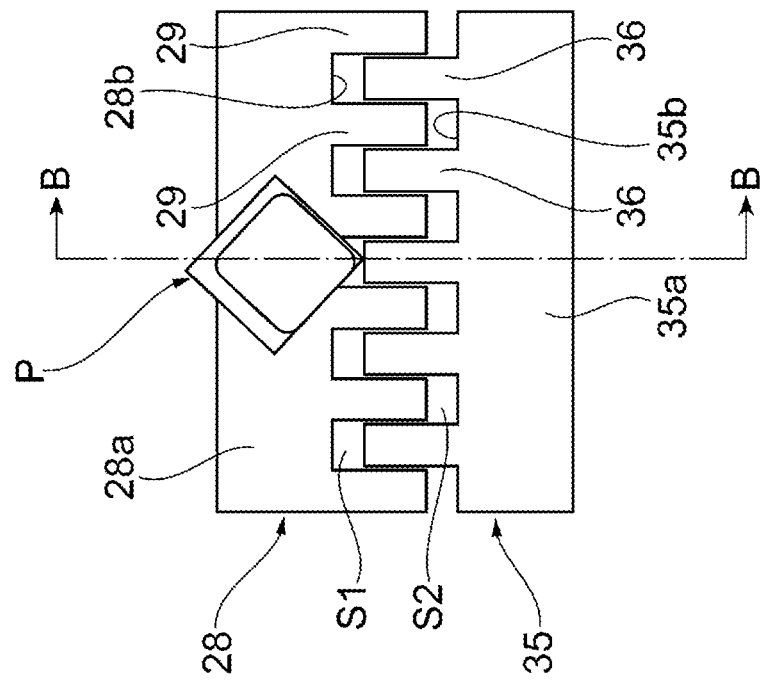
(b)
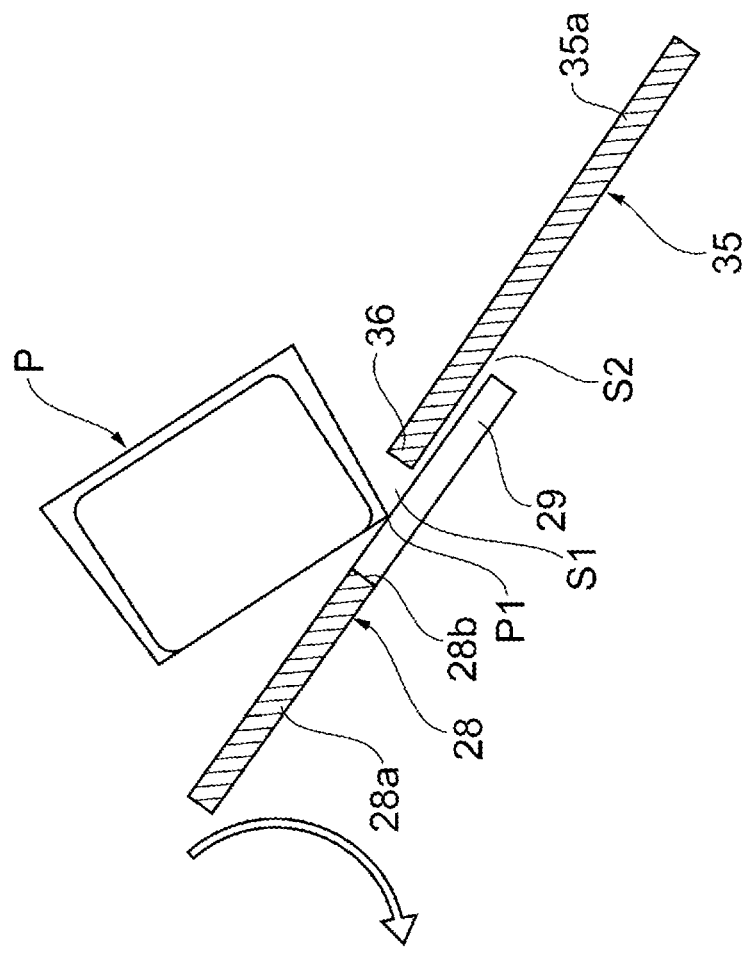
(a)

FIG. 19
(b)
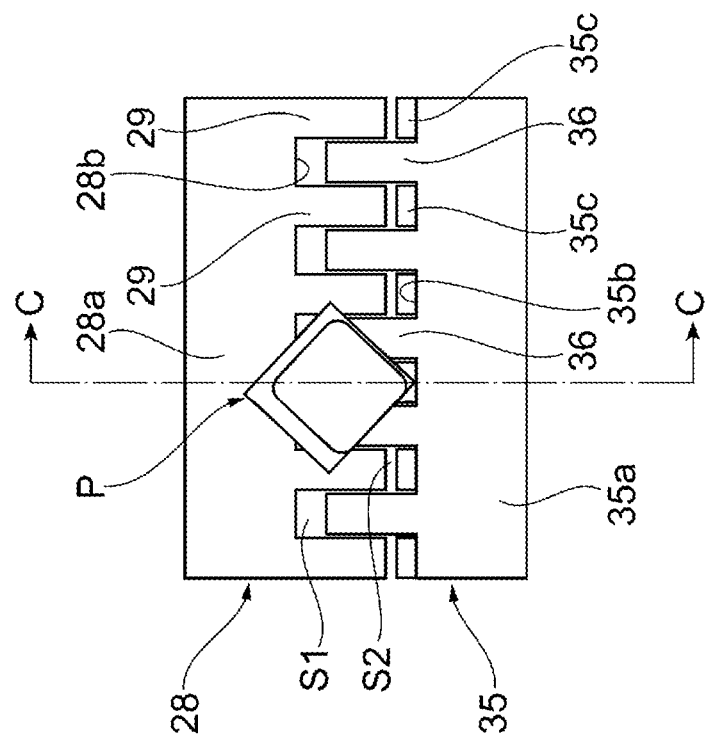
(a)
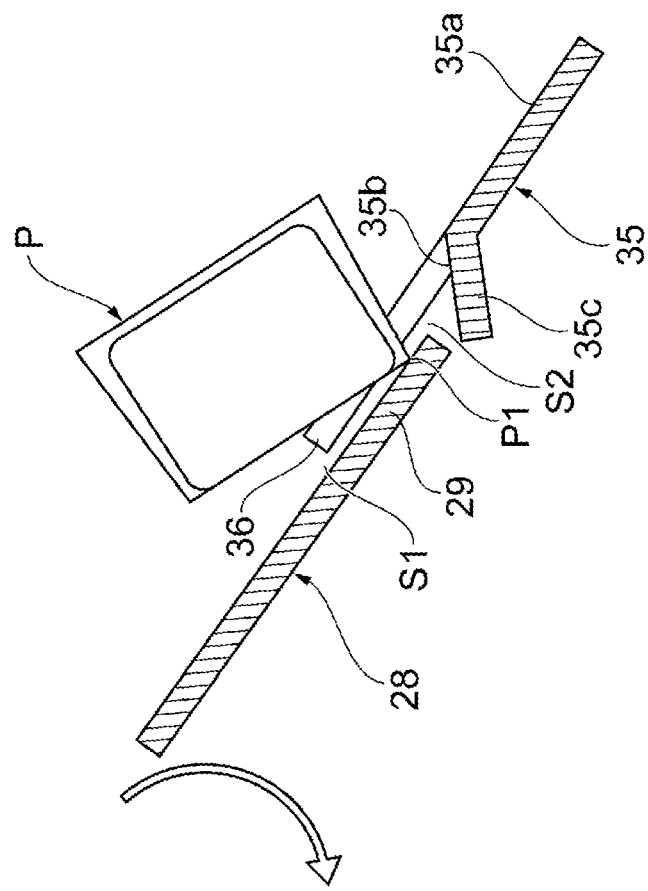

FIG. 20
(a)
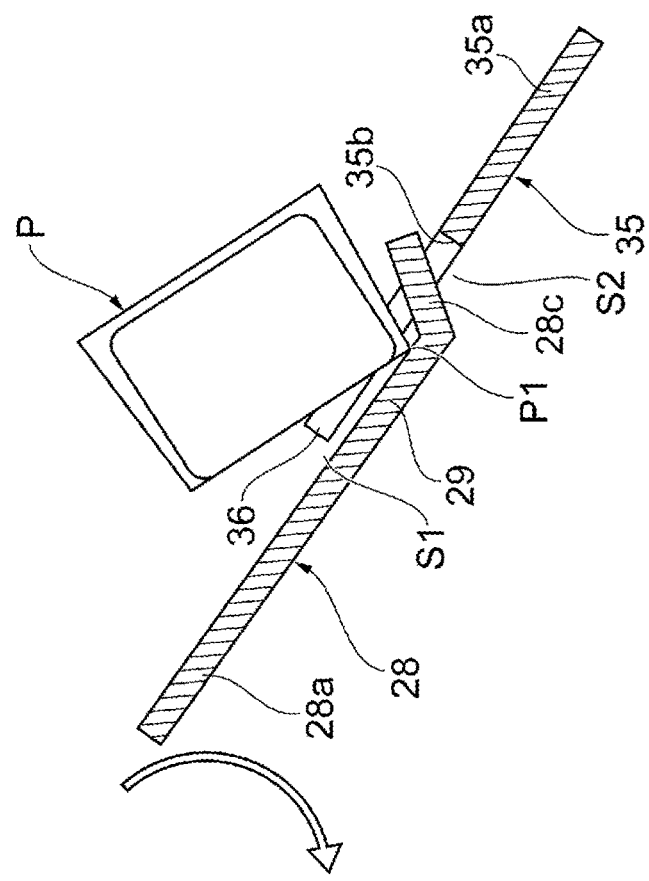
(b)
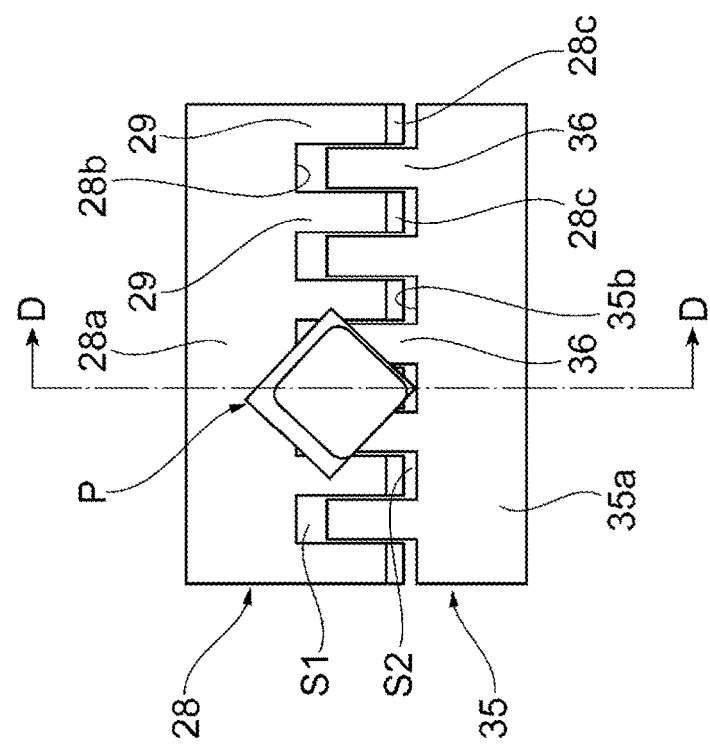

FIG. 21
(a)
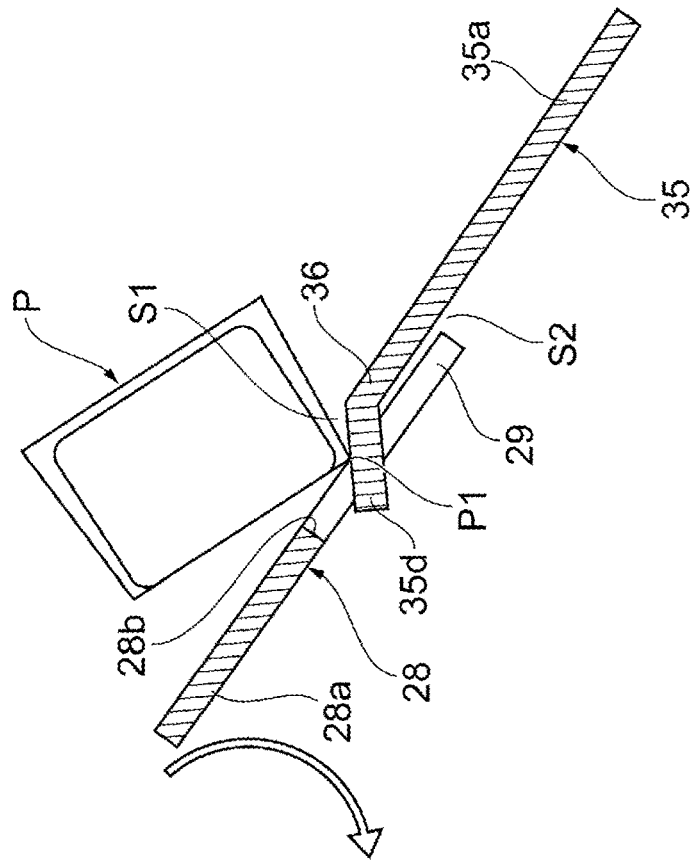
(b)
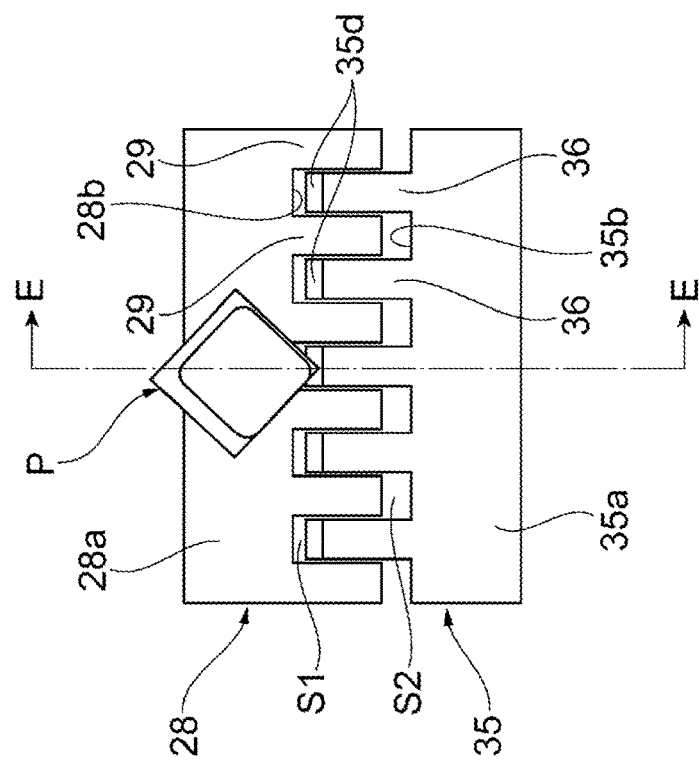

FIG. 22
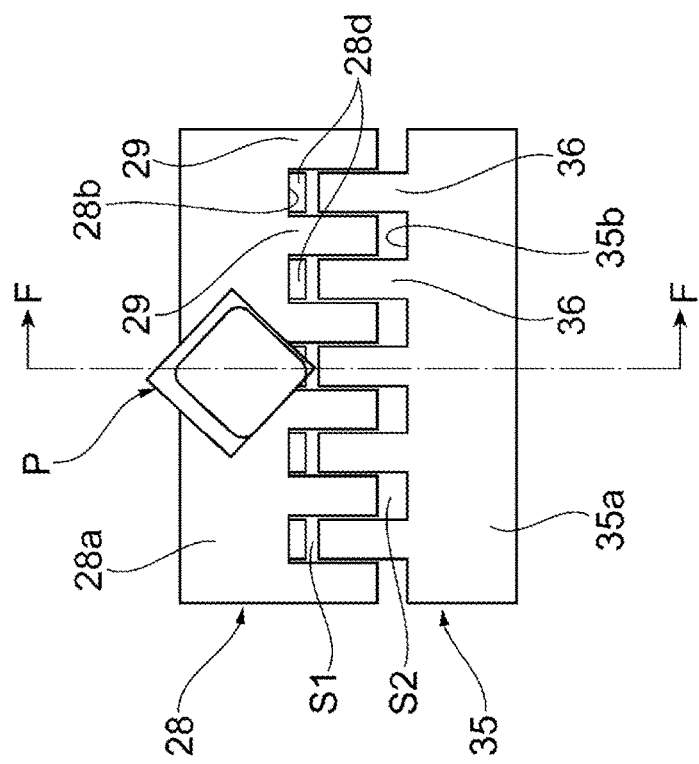
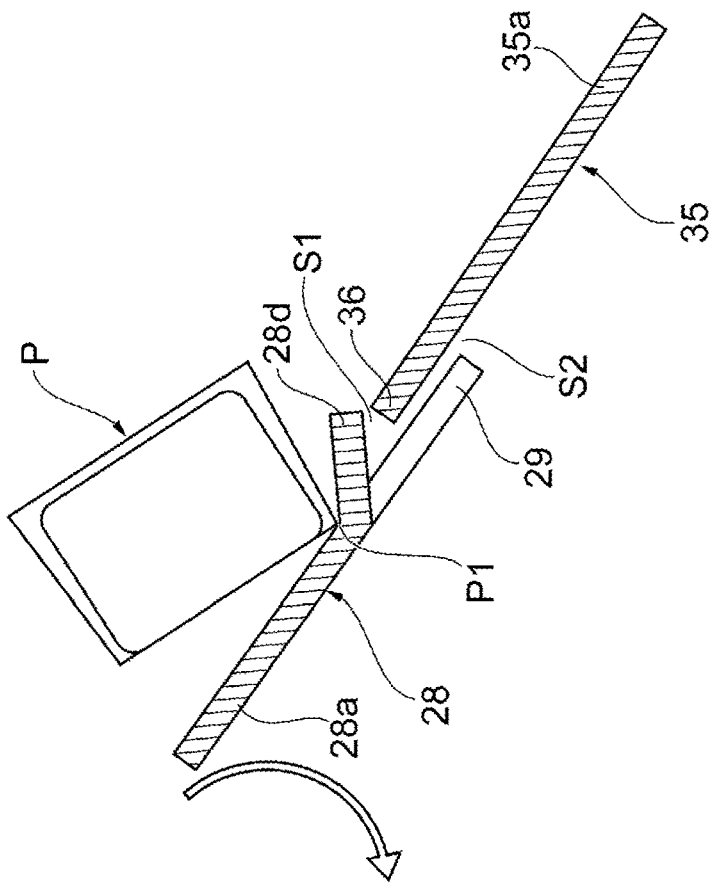

FIG. 24
(a)
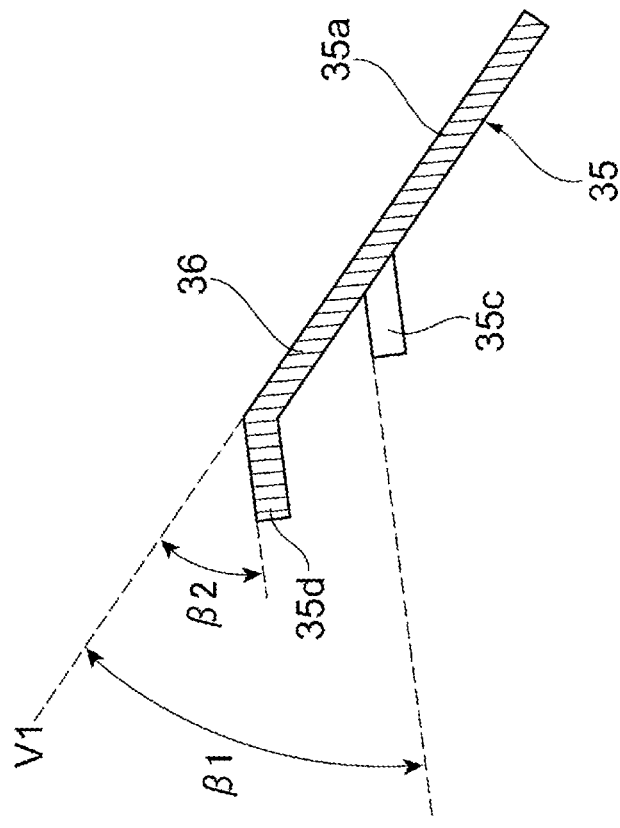
(b)
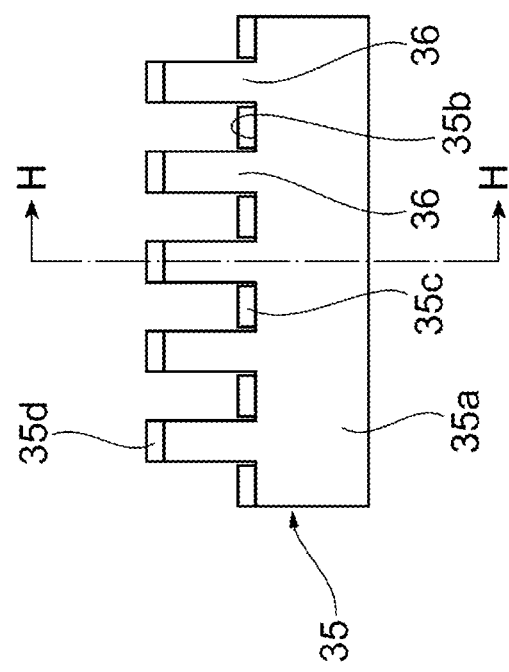

FIG. 25
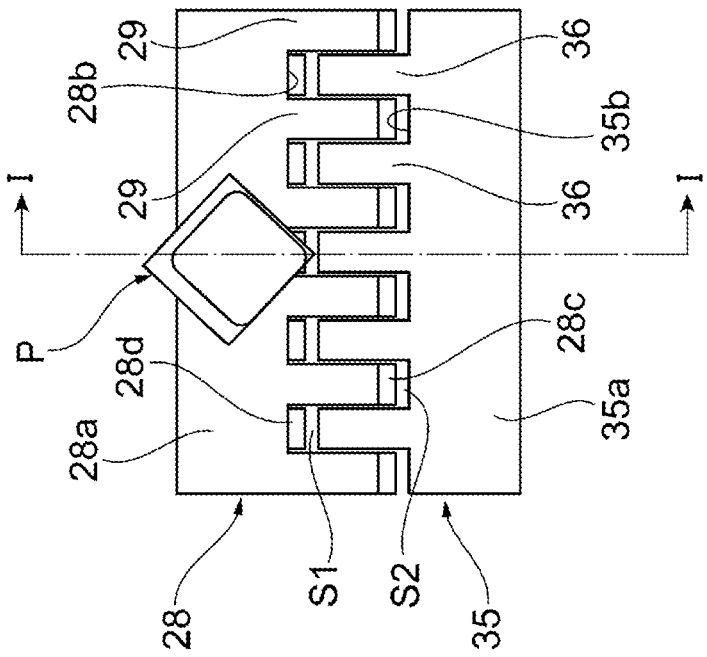
(a)
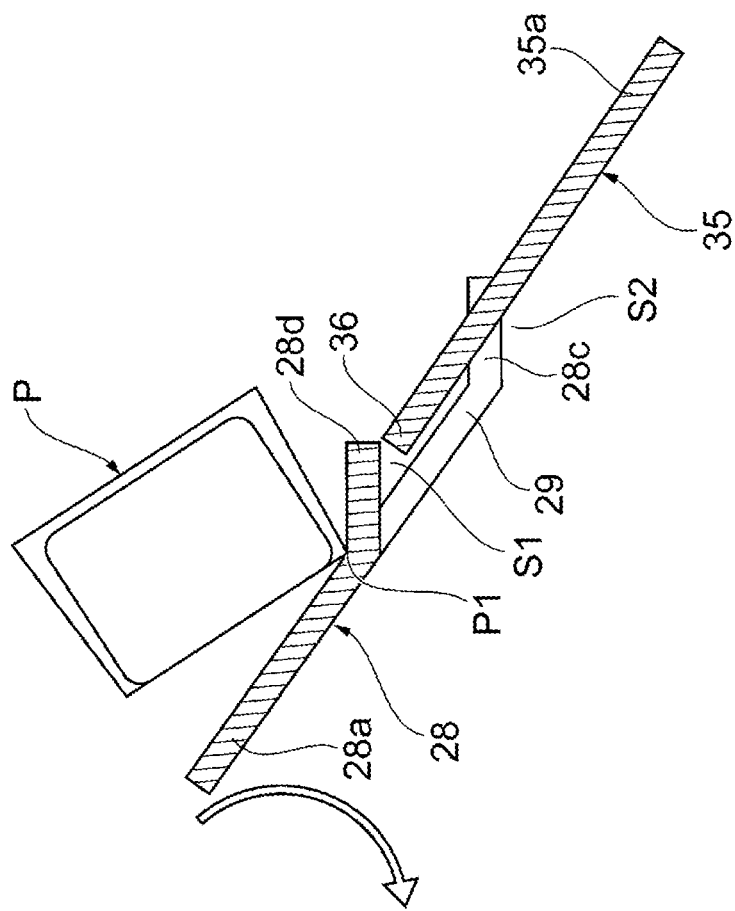
(b)

FIG. 26
(b)
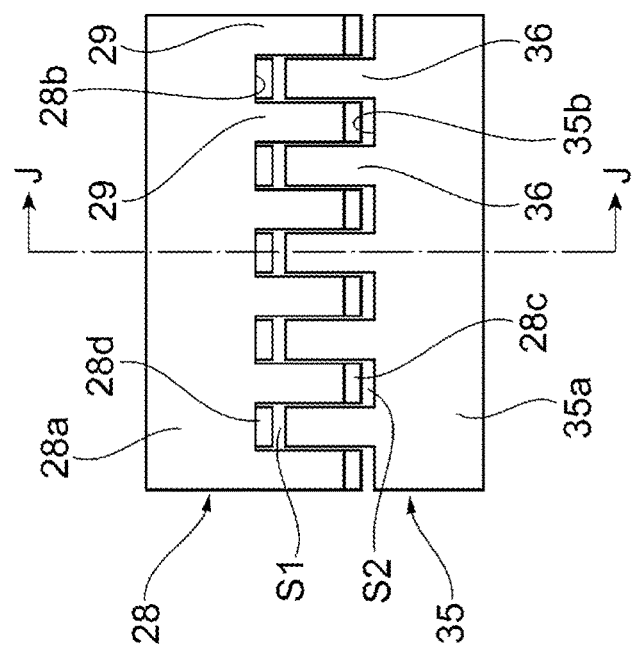
(a)
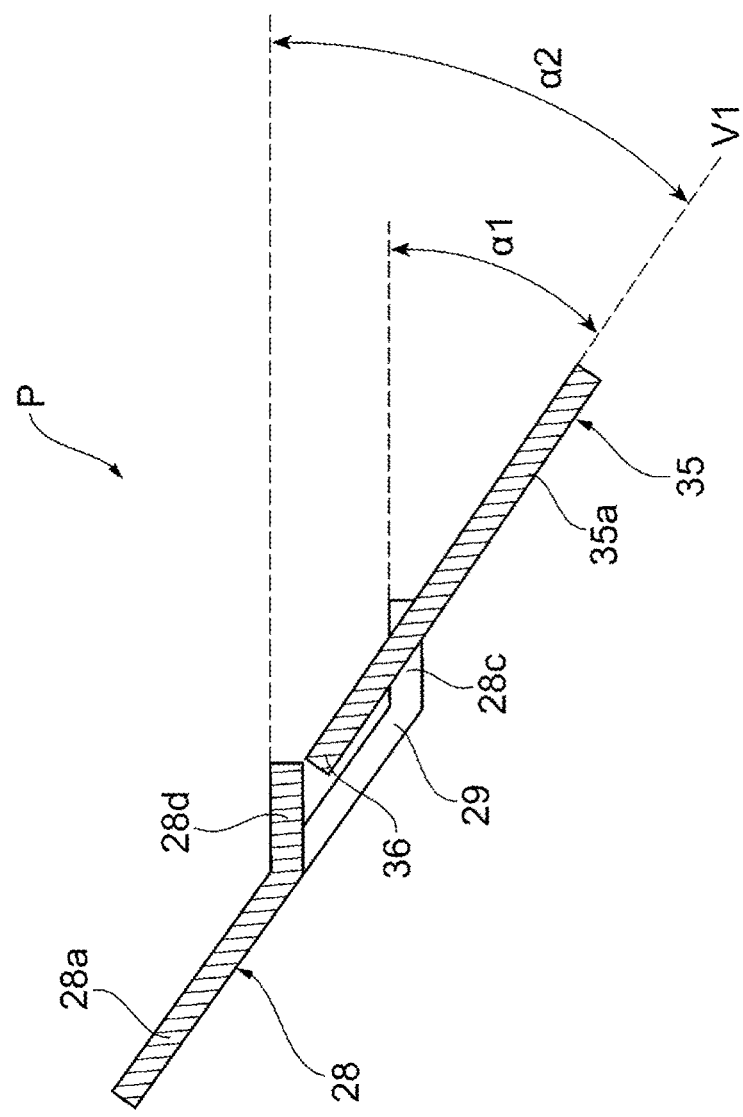

FIG. 27
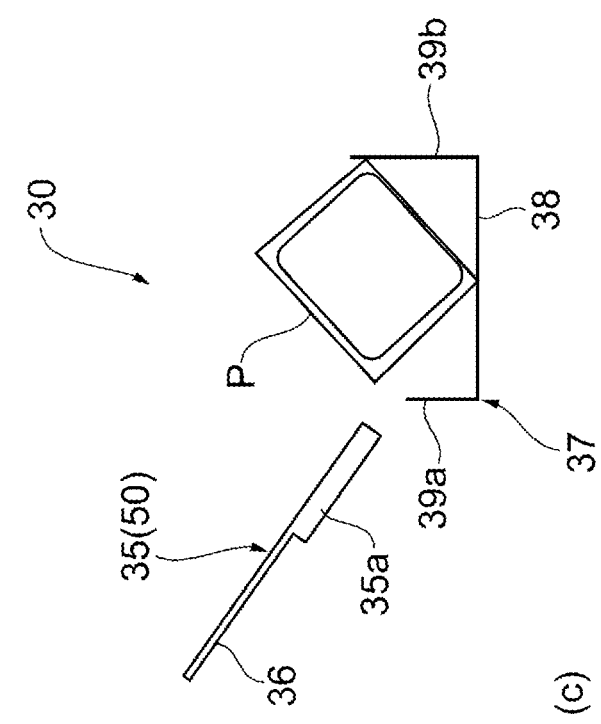
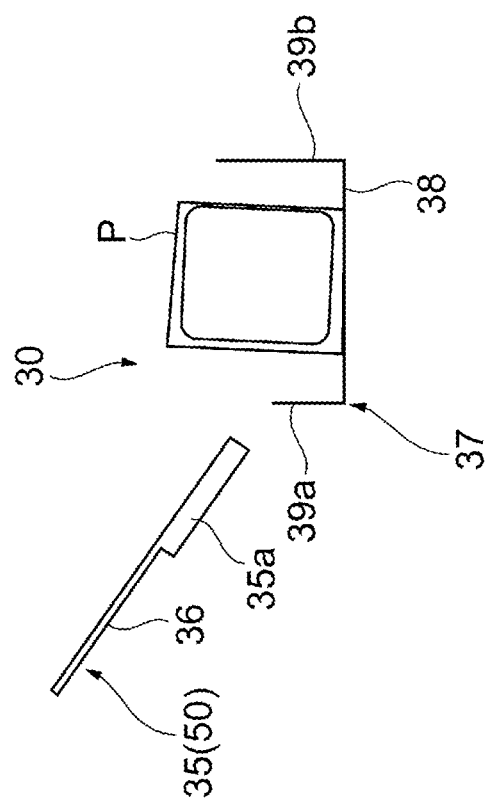
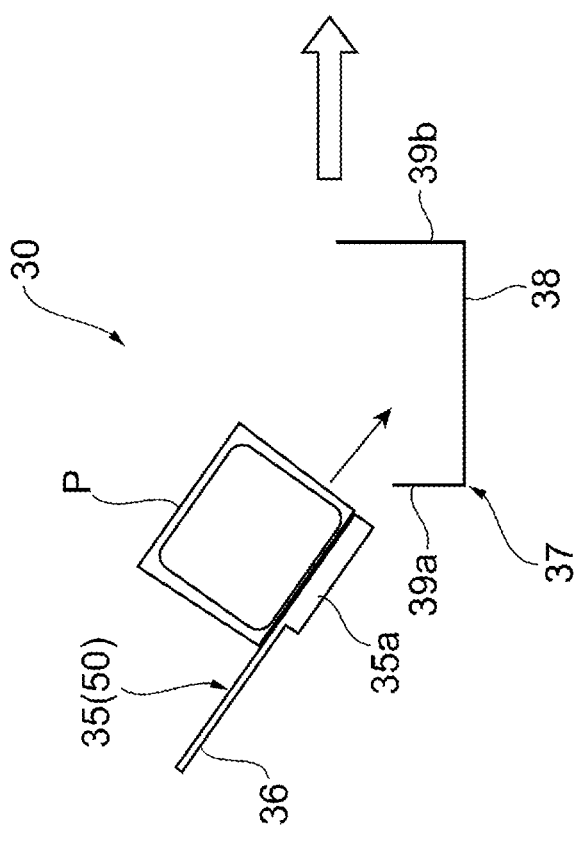

FIG. 30
(a)
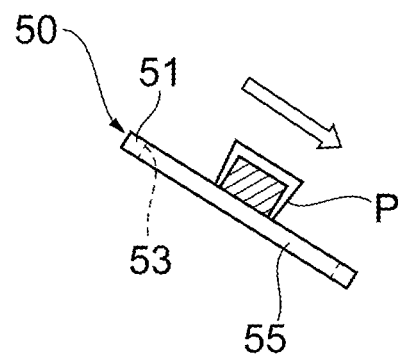
(b)
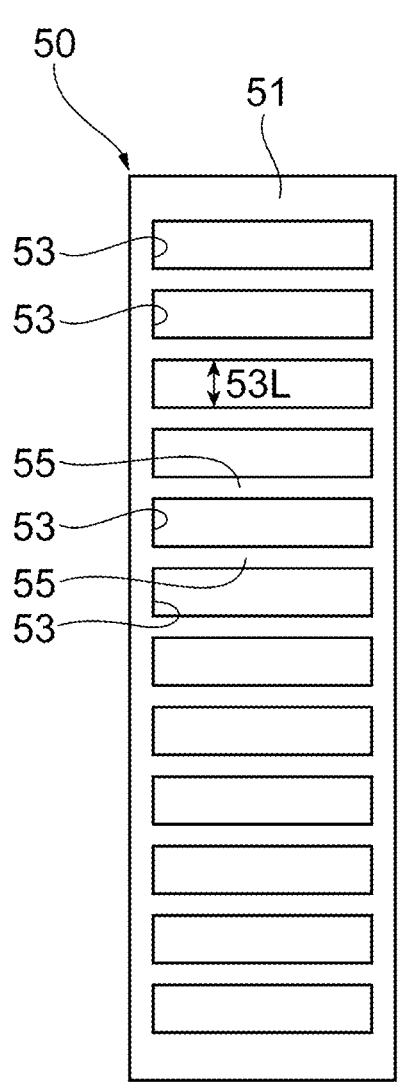
(c)
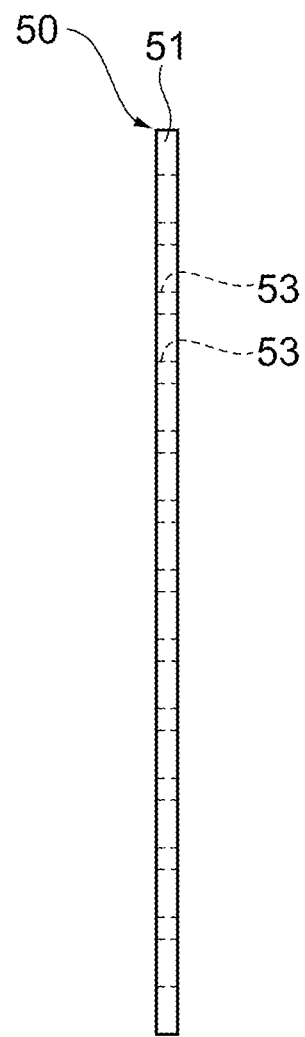

FIG. 31
(a)
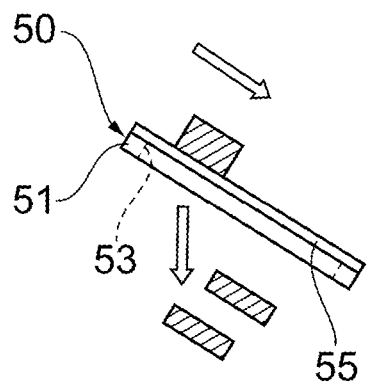
(b)
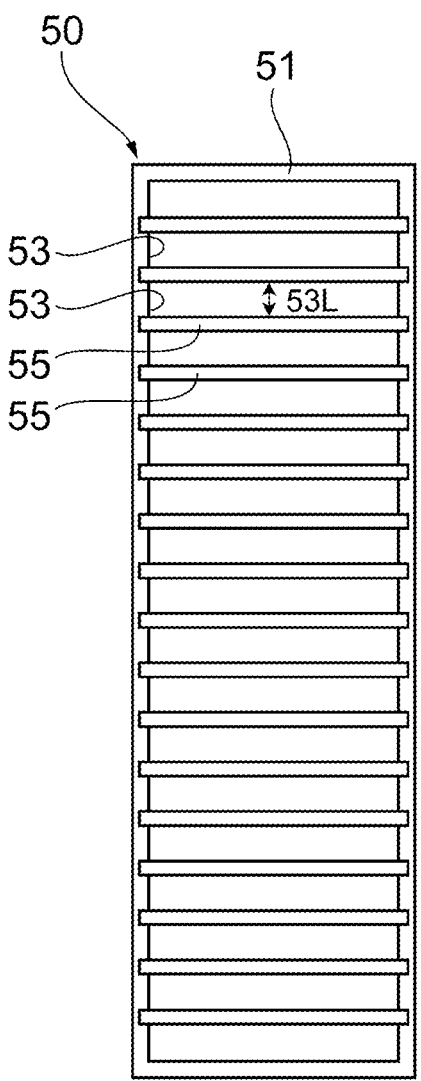
(c)
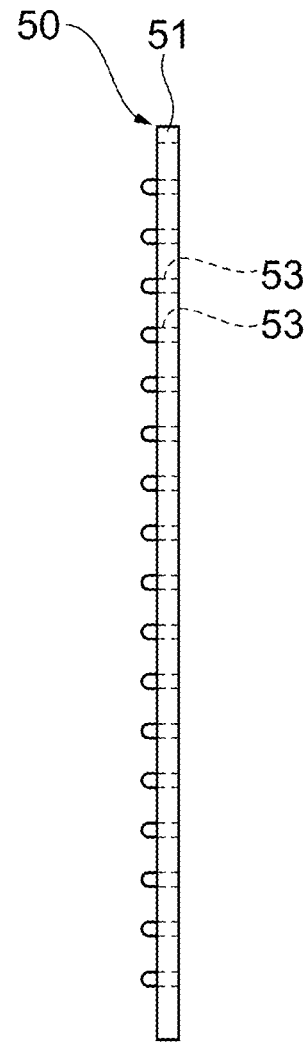

FIG. 32
(a)
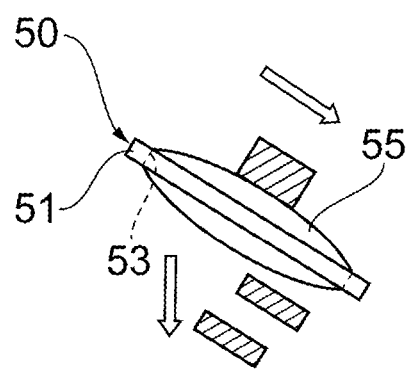
(b)
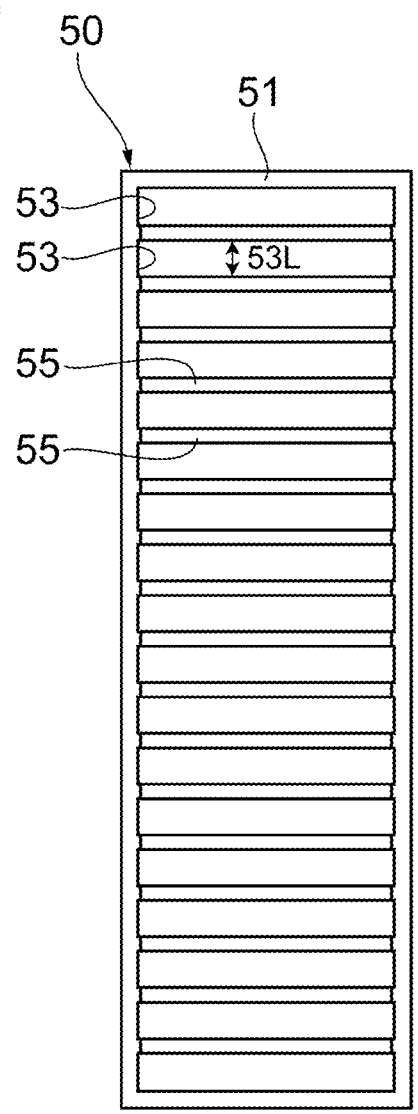
(c)
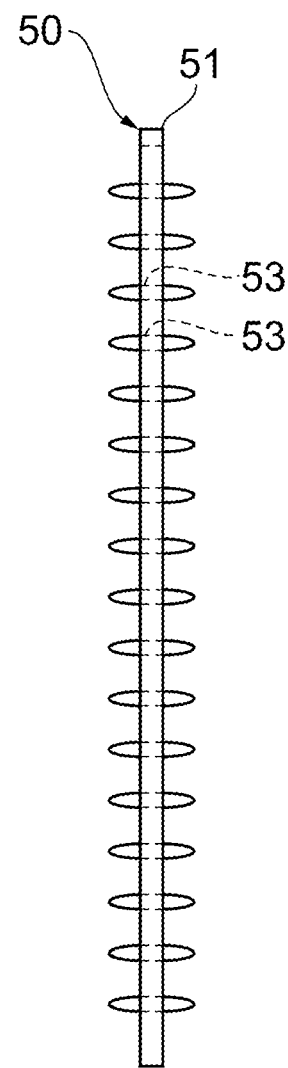

FIG. 33
(a)
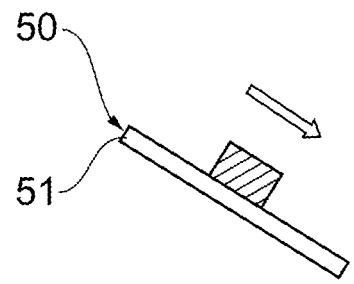
(b)
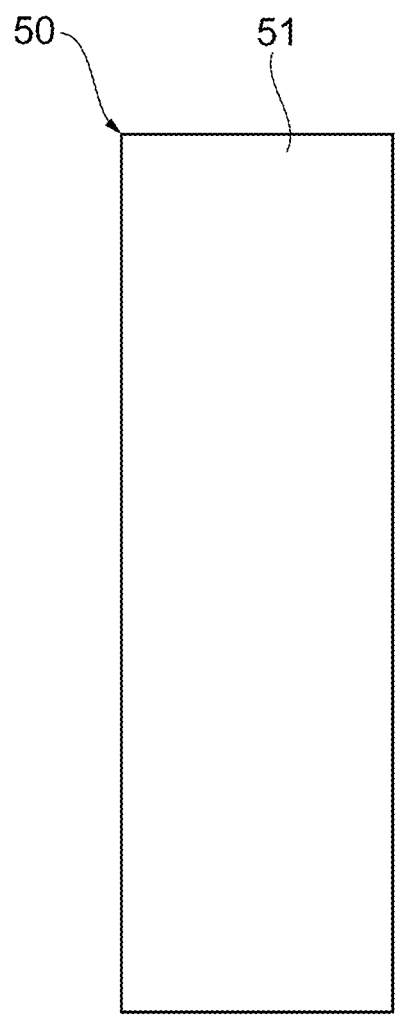
(c)
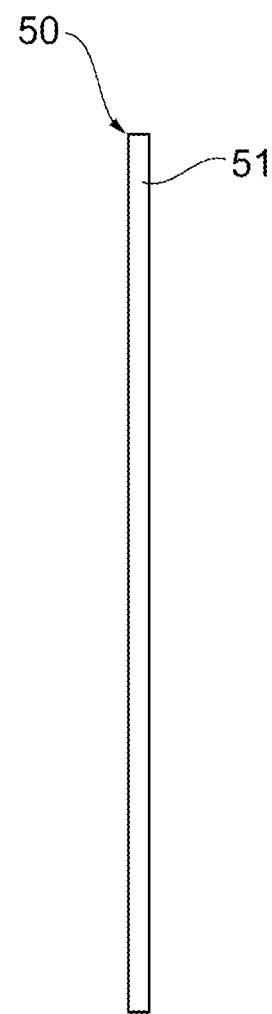

INVERSION GUIDE DEVICE AND TOFU PRODUCTION DEVICE

TECHNICAL FIELD

The present invention relates to an inversion guide device that guides tofu while inverting the tofu, and a tofu production device using the same.

BACKGROUND ART

Generally, in a production process of silken tofu, a soymilk as a raw material is coagulated and aged in a holeless frame with a coagulant added, and in a production process of firm tofu, a soymilk is coagulated and aged in an appropriate container (for example, a tub, a bucket, a frame, or the like) in the same manner. Next, the coagulated and aged product is poured into a holey mold having a filter cloth laid thereon to be compacted and molded. Thereafter, the tofu is produced by being taken out from the mold, cut into a predetermined size, and packed.

Generally, a transfer conveyor that transfers the tofu covered with a pack is an endless conveyor, in which the tofu covered with the pack is inverted while being guided from an upper side to a lower side at a turn-back portion at one end, and the tofu is stored in the pack and sent to the next step. In a related-art device, a plate-shaped guide plate is provided so as to correspond to the turn-back portion of the transfer conveyor, and the guide plate guides the tofu (see Patent Literatures 1 to 3).

CITATION LIST

Patent Literature

Patent Literature 1: JP-A-S63-203516
Patent Document 2: JP-A-H03-219850
Patent Literature 3: JP-A-2007-006759

SUMMARY OF INVENTION

Technical Problem

Although the related-art guide plate guides the tofu, since the guide plate is a fixed curved plate, the guide plate guides the tofu on the basis of the gravity acting on the tofu at the turn-back portion of the transfer conveyor. Therefore, the tofu has too much momentum to fall, and soft tofu is often cracked or chipped by an impact. In addition, a falling timing of each cake of tofu is slightly different due to a natural drop, and the tofu is clogged, so that processing capacity is limited.

In order to solve the above problems, it is conceivable to increase an amount of coagulant to be added to the soymilk to harden the tofu, but there is a drawback that heat sterilization after packaging causes a large amount of water separation and a taste is lost. Since there are various types of tofu or packs for packing tofu, when a size of the tofu or the pack for packing the tofu changes, it is necessary to replace the guide plate itself, adjust a position of the guide plate, and the like, which leads to deterioration of working efficiency.

The present invention provides an inversion guide device capable of smoothly inverting tofu and a tofu production device using the same.

Solution to Problem

An inversion guide device according to an aspect of the present invention is an inversion guide device configured to guide tofu conveyed by a transfer conveyor and inverted by a turn-back portion at one end of the transfer conveyor. The inversion guide device includes an endless conveyor configured to support the tofu along a track of the turn-back portion and guide the tofu while being driven in a circulating manner.

In the inversion guide device, for example, a distance between the turn-back portion and the endless conveyor is adjustable, or the turn-back portion and the endless conveyor are attachable to and detachable from each other.

The inversion guide device further includes, for example, a support base configured to support the endless conveyor. The support base includes a position adjustment unit configured to adjust a position of the endless conveyor with respect to the turn-back portion in a horizontal direction, or configured to attach and detach the turn-back portion and the endless conveyor to from each other.

The inversion guide device further includes, for example, a guide member arranged between the turn-back portion and the endless conveyor and configured to guide the endless conveyor. The guide member is movable to adjust a distance with respect to the turn-back portion.

The inversion guide device further includes, for example, a rotation shaft support member configured to rotatably support a rotation shaft of the endless conveyor. The rotation shaft is supported by the rotation shaft support member in a state of being movable in a horizontal direction (that may be a front-rear direction or an upper-lower direction).

In the inversion guide device, for example, the endless conveyor includes a stopper member configured to receive the tofu moving at the turn-back portion.

In the inversion guide device, for example, the stopper member is attached to the endless conveyor at an angle inclined with respect to a traveling direction of the endless conveyor.

A tofu production device according to an aspect of the present invention includes a transfer conveyor, the above-described inversion guide device, and a tofu receiving device (for example, a chute) configured to receive tofu inverted by the inversion guide device and pass the tofu to a next step.

In the tofu production device according to the aspect of the present invention, for example, the tofu receiving device includes a discarding device configured to discard defective tofu downward.

In the tofu production device according to the aspect of the present invention, for example, the discarding device is a movable chute configured to be opened and closed or a fixed chute having an opening.

In the tofu production device according to the aspect of the present invention, for example, the endless conveyor includes a stopper member configured to receive the tofu moving at the turn-back portion, a distal end of the stopper member has a comb-teeth shape in a width direction, and a distal end of the tofu receiving device (for example, a chute, a movable chute, or a fixed chute) has a comb-teeth shape that does not interfere with the distal end of the stopper member.

In the tofu production device according to the aspect of the present invention, for example, the discarding device is a movable chute that is opened and closed, and the movable chute is of an operation type of at least one of a passive operation using a spring or a damper, a manual operation, and an active operation using a cylinder or a motor. For example, the discarding device may be a fixed chute having an opening for discarding tofu or the like by crushing the tofu or the like to be discarded, which is not covered with a pack and is chipped or cracked, by an own weight thereof and dropping the tofu downward.

In the tofu production device according to the aspect of the present invention, for example, the endless conveyor of the inversion guide device is configured to be synchronized with the transfer conveyor.

In the tofu production device according to the aspect of the present invention, for example, the endless conveyor includes stopper members configure to receive respective cakes of tofu moving at the turn-back portion, and where Va is a speed of the endless conveyor, Vb is a speed of the transfer conveyor, a is a stopper pitch that is a pitch of the stopper members, and b is a front-back pitch of the cakes of tofu on the transfer conveyor, a=b is satisfied and a circulating speed Va of the endless conveyor and a circulating speed Vb of the turn-back portion of the transfer conveyor are the same (Va=Vb).

In the tofu production device according to the aspect of the present invention, for example, the endless conveyor includes stopper members configured to receive respective cakes of tofu moving at the turn-back portion, and where Va is a speed of the endless conveyor, Vb is a speed of the transfer conveyor, a is a stopper pitch that is a pitch of the stopper members, and b is a front-back pitch of the cakes of tofu on the transfer conveyor, when the speed Va of the endless conveyor is larger than the speed Vb of the turn-back portion of the transfer conveyor (Va>Vb), n a/Va=b/Vb (n: natural number) is satisfied.

In the tofu production device according to the aspect of the present invention, for example, the inversion guide device is surrounded by a cover, and the inversion guide device includes a cleaning nozzle configured to spray a cleaning liquid or a steam nozzle configured to inject high-temperature steam for sterilization inside the cover.

Advantageous Effects of Invention

According to the present invention, it is possible to simultaneously and smoothly invert a large number of cakes of aligned tofu while guiding the tofu by an endless conveyor, and it is possible to prevent a falling speed of the tofu at a turn-back portion, thereby increasing processing capacity without damaging the tofu.

BRIEF DESCRIPTION OF DRAWINGS (a) to (b) of FIG. 1 are side views of a tofu production device including an inversion guide device according to a first embodiment, in which (a) is a side view during use and (b) is a side view during cleaning or the like.

(a) to (b) of FIG. 4 are side views showing an operation of the inversion guide device according to the first embodiment, in which (a) is a side view in a state where the inversion guide device is close to a transfer conveyor, and (b) is a side view in a state where the inversion guide device is separated from the transfer conveyor.

(a) to (b) of FIG. 5 are side views showing an operation of an inversion guide device according to a second embodiment, in which (a) is a side view in a state where the inversion guide device is close to a transfer conveyor, and (b) is a side view in a state where the inversion guide device is separated from the transfer conveyor.

Figure 6:
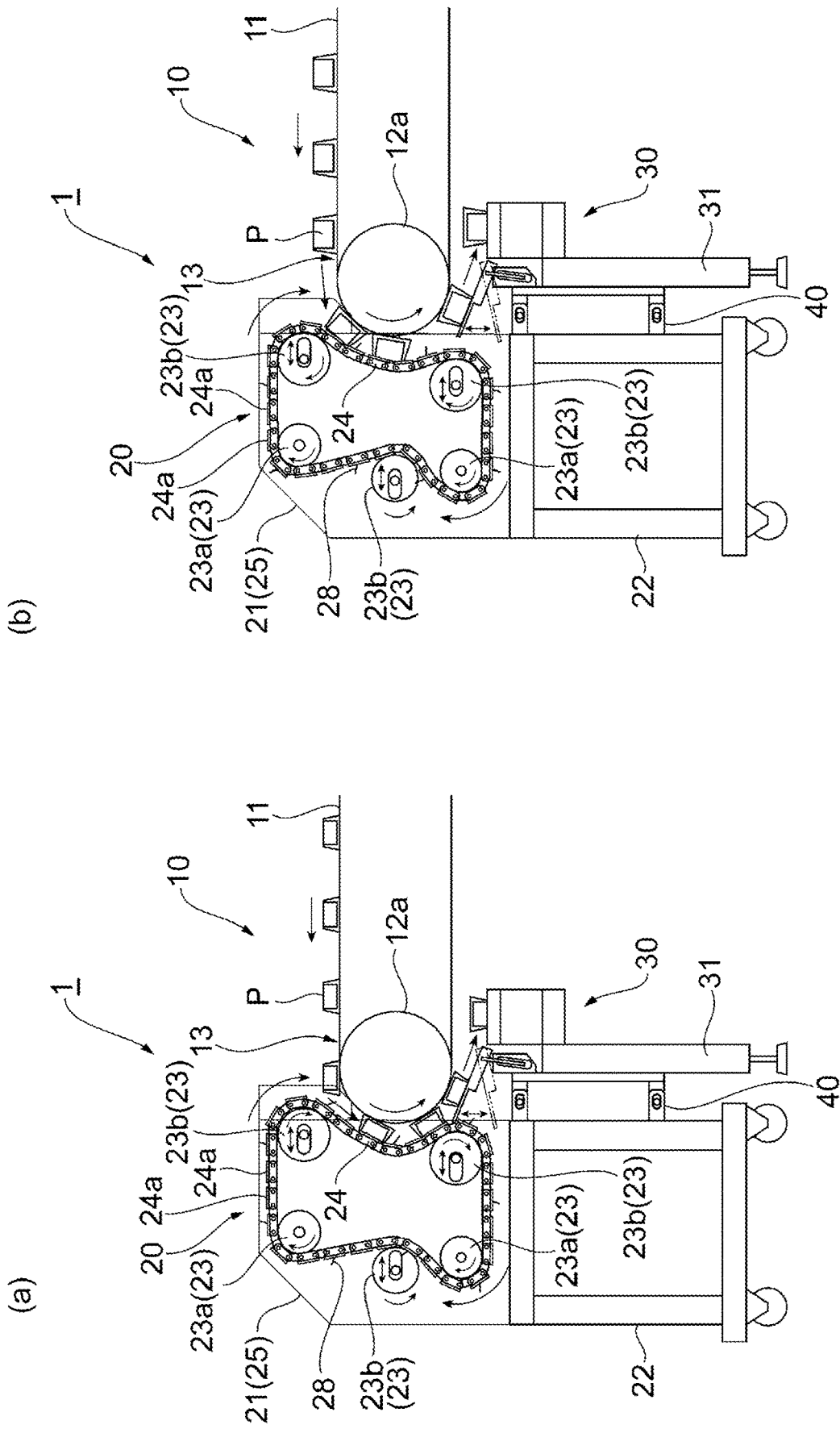

(a) to (b) of FIG. 6 are side views showing an operation of an inversion guide device according to a third embodiment, in which (a) is a side view in a state where the inversion guide device is close to a transfer conveyor, and (b) is a side view in a state where the inversion guide device is separated from the transfer conveyor.

Figure 7:
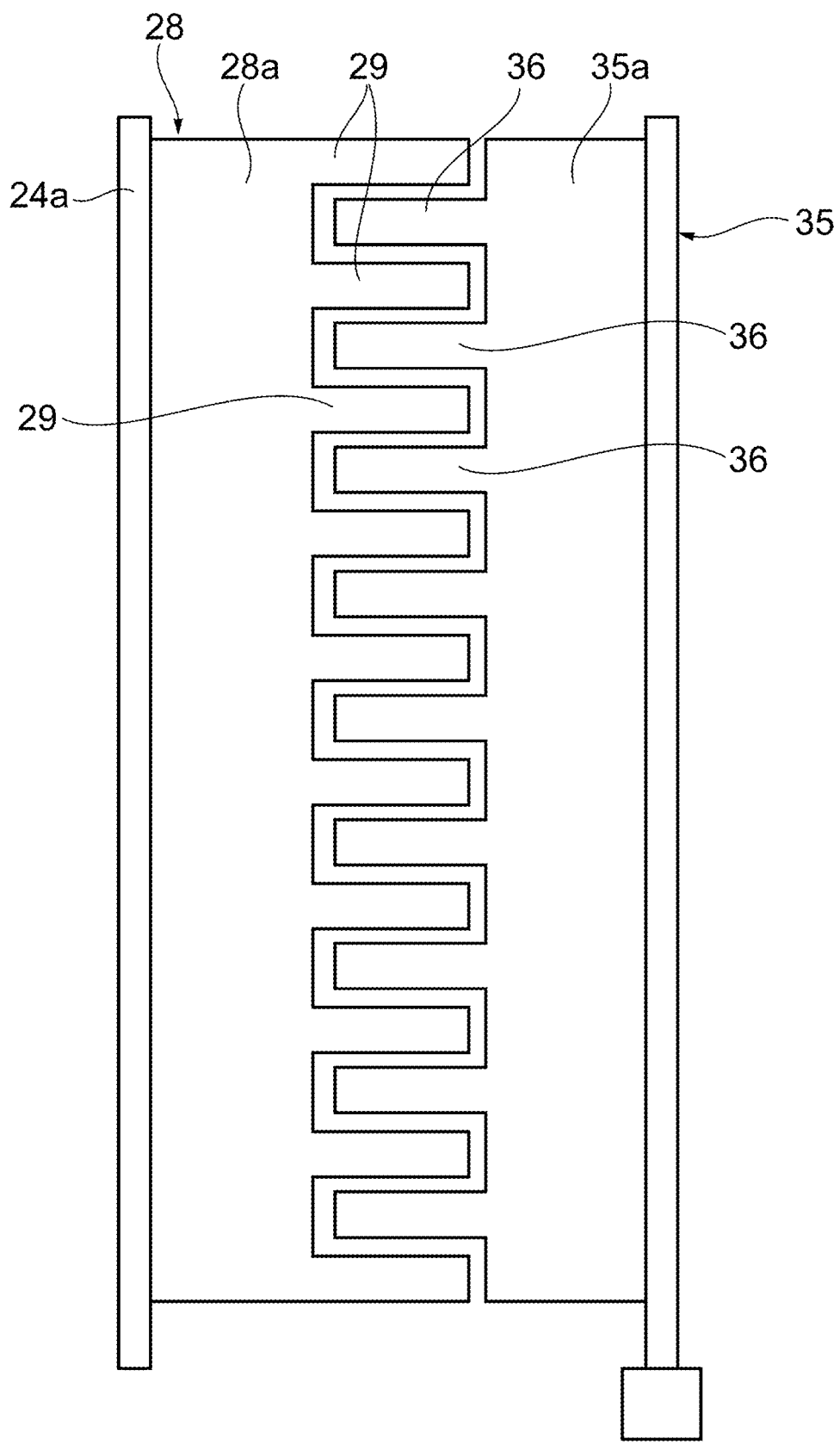

FIG. 7 is a top view of a stopper member and a movable chute that discards tofu downward, which are facing each other.

(a) to (c) of FIG. 8 are side views of the stopper member and the movable chute that discards the tofu downward, which are facing each other, in which (a) shows an example of a form in which an elongated protrusion of the stopper member is bent at one position, (b) shows an example of a form in which an elongated protrusion of the stopper member is bent, and (c) shows an example in which an elongated protrusion of the stopper member is bent at two positions.

(a) to (d) of FIG. 9 are side views of various modifications of an overall configuration of the stopper member, in which (a) shows an example of the stopper member having a mountain shape in a side view, (b) shows an example of the stopper member having a bent shape in a side view, (c) shows an example of the stopper member having a curved shape in a side view, and (d) shows a comparative example of the stopper member having a linear shape in a side view.

Figure 10:
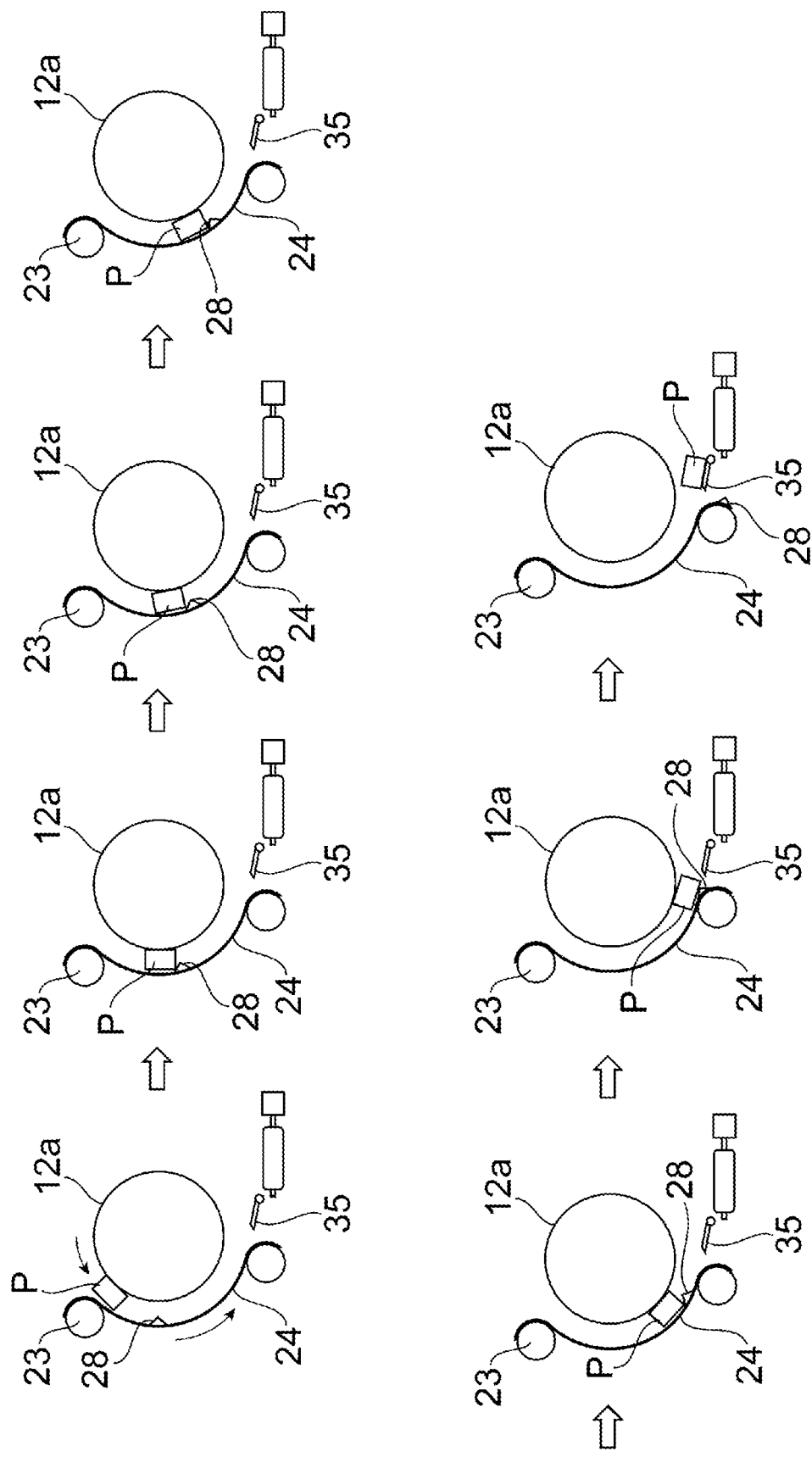

FIG. 10 is a conceptual view of an inversion process using the stopper member in (a) of FIG. 9.

Figure 11:
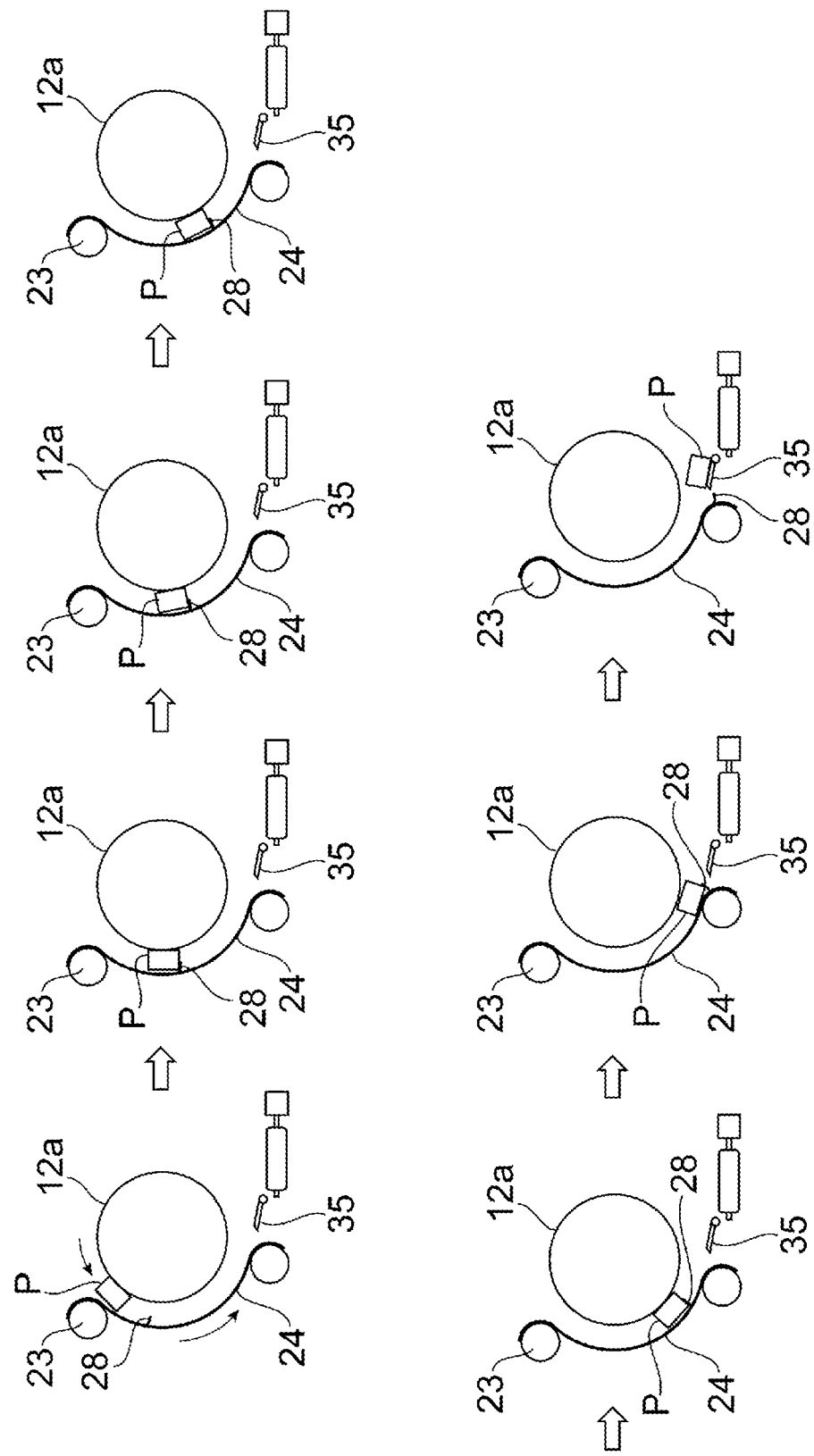

FIG. 11 is a conceptual view of an inversion process using the stopper member in (b) of FIG. 9.

Figure 12:
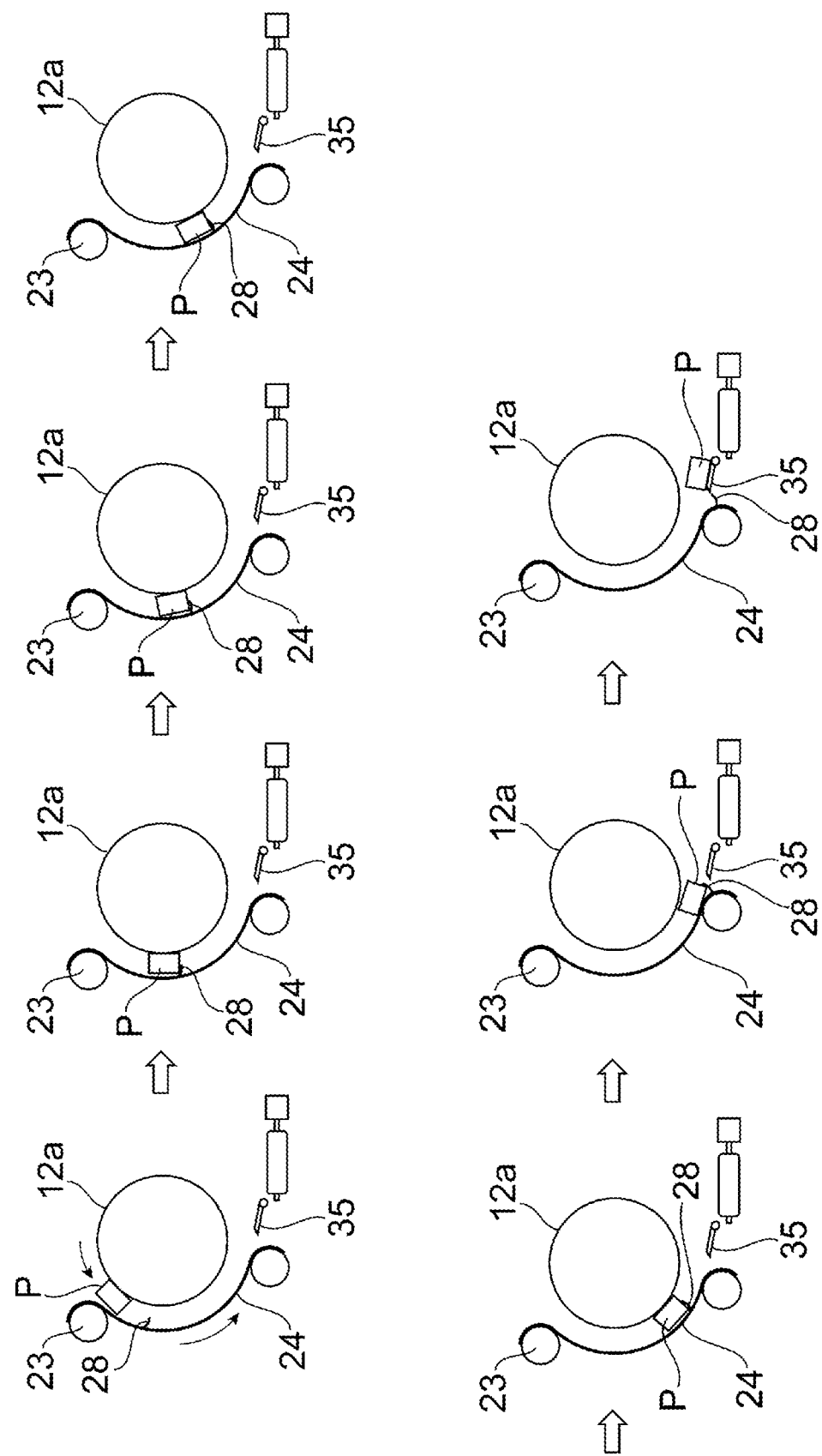

FIG. 12 is a conceptual view of an inversion process using the stopper member in (c) of FIG. 9.

Figure 13:
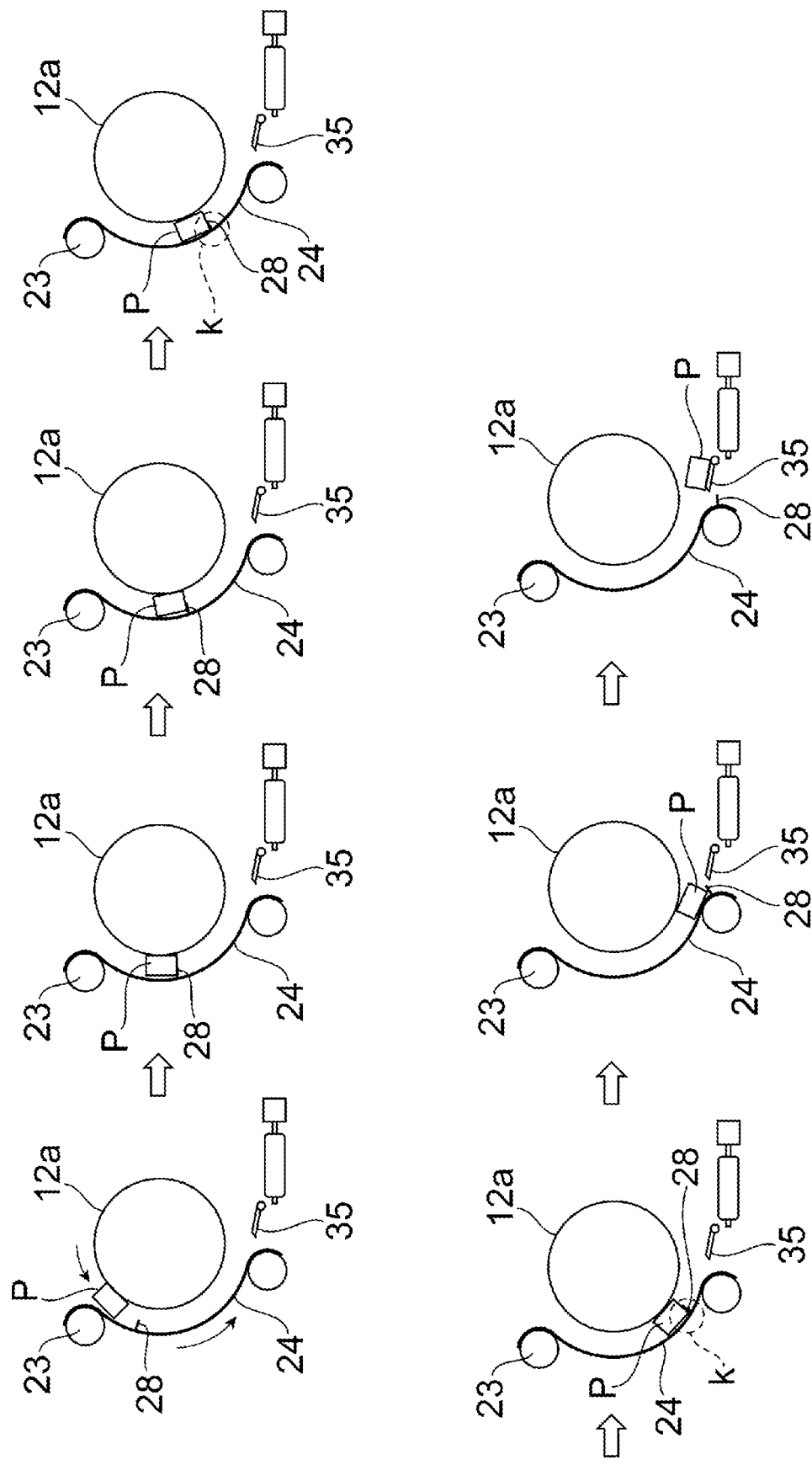

FIG. 13 is a conceptual view of an inversion process using the stopper member in (d) of FIG. 9.

(a) to (c) of FIG. 14 are views showing various modifications of the movable chute, in which a) shows a manually operated movable chute, (b) shows a cylinder-operated movable chute, and (c) shows a motor-operated movable chute.

Figure 15:
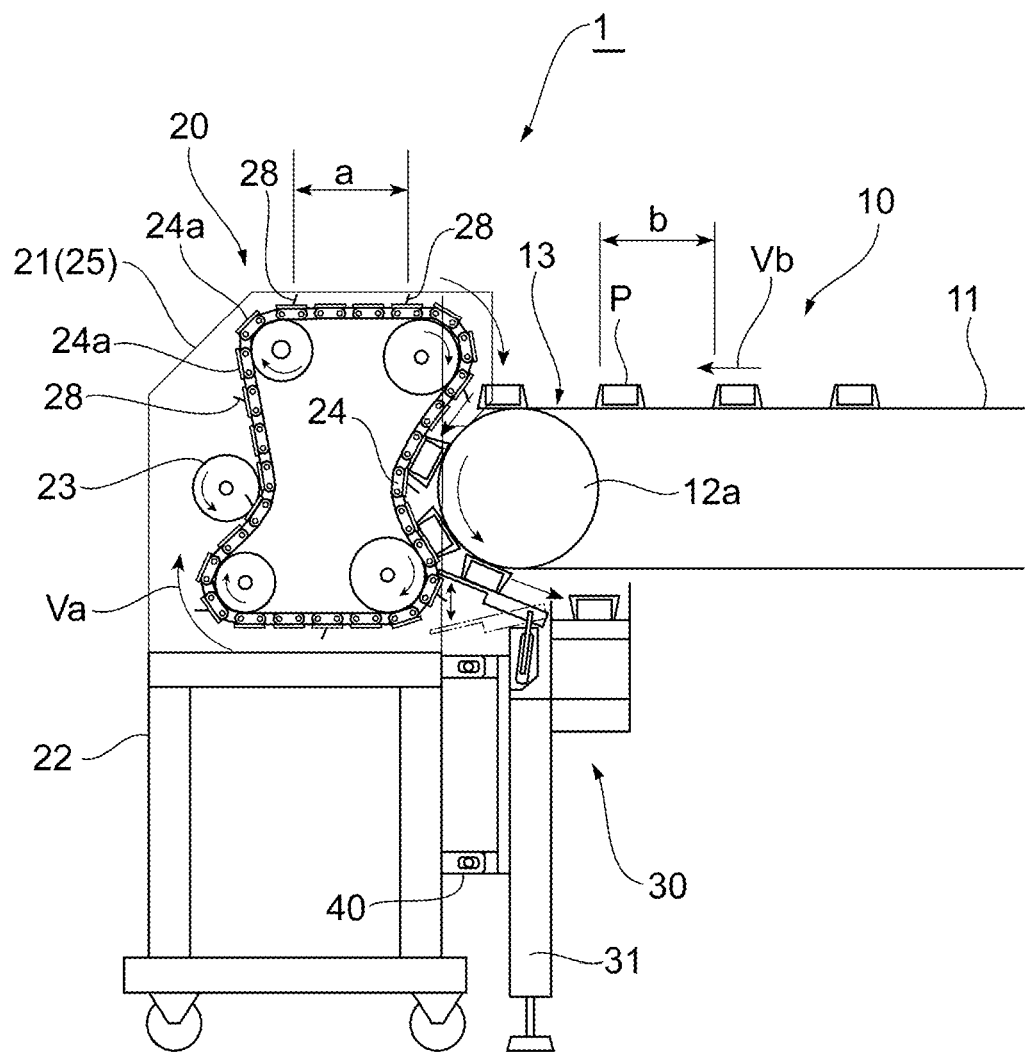

FIG. 15 is a side view of the tofu production device, showing a speed Va of an endless conveyor, a speed Vb of the transfer conveyor, a stopper pitch a that is a pitch of the stopper members, and a front-back pitch b of the tofu on the transfer conveyor.

Figure 16:
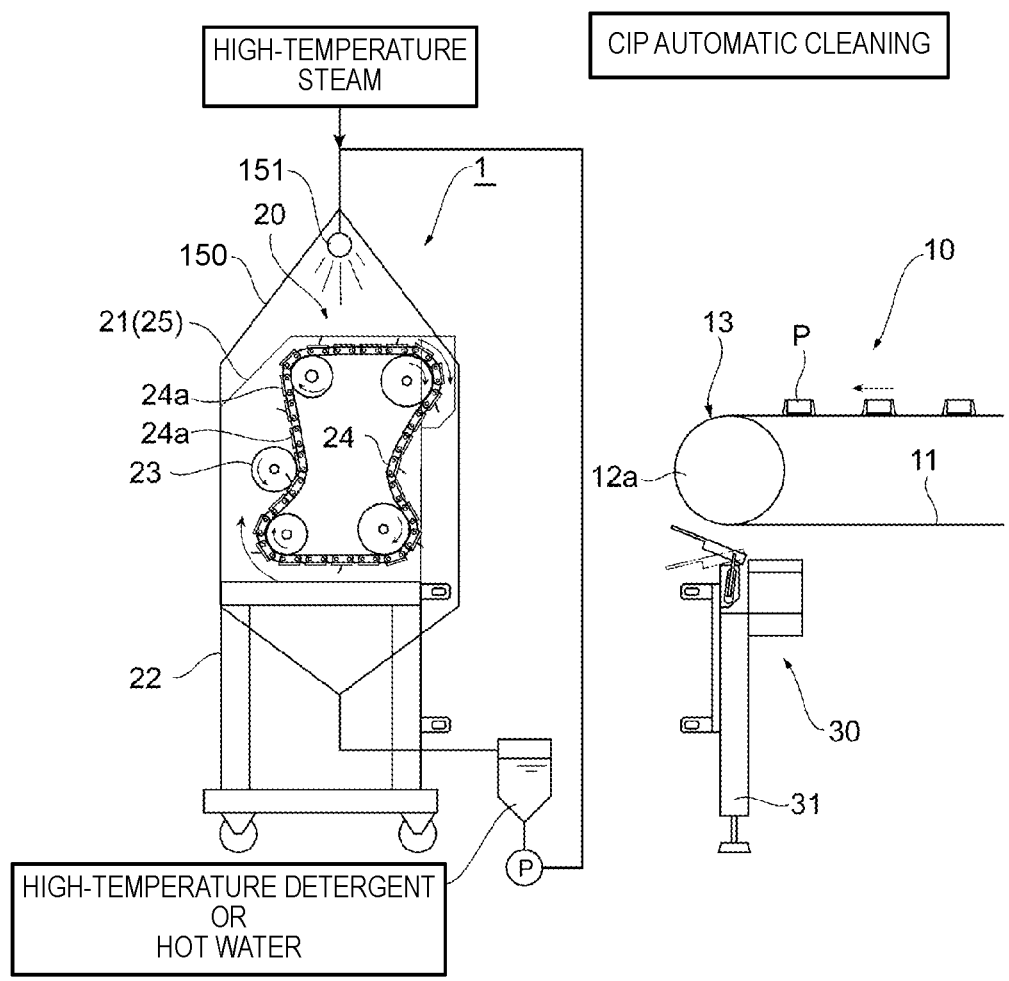

FIG. 16 is a side view of the tofu production device having a cover.

(a) to (b) of FIG. 17 are views showing a state where a corner of a bottom surface of the tofu (pack) enters a second gap, in which (a) is a side view and (b) is a top view. Note that (a) is a cross-sectional view taken along a line A-A in (b).

(a) to (b) of FIG. 18 are views showing a state where a corner of the bottom surface of the tofu (pack) enters a first gap, in which (a) is a side view and (b) is a top view. Note that (a) is a cross-sectional view taken along a line B-B in (b).

(a) to (b) of FIG. 19 are views showing an embodiment in which a third guide portion is provided in the movable chute, in which (a) is a side view and (b) is a top view. Note that (a) is a cross-sectional view taken along a line C-C in (b).

(a) to (b) of FIG. 20 are views showing an embodiment in which a first guide portion is provided in the stopper member, in which (a) is a side view and (b) is a top view. Note that (a) is a cross-sectional view taken along a line D-D in (b).

(a) to (b) of FIG. 21 are views showing an embodiment in which a fourth guide portion is provided in the movable chute, in which (a) is a side view and (b) is a top view. Note that (a) is a cross-sectional view taken along a line E-E in (b).

(a) to (b) of FIG. 22 are views showing an embodiment in which a second guide portion is provided in the stopper member, in which (a) is a side view and (b) is a top view. Note that (a) is a cross-sectional view taken along a line F-F in (b).

Figure 23:
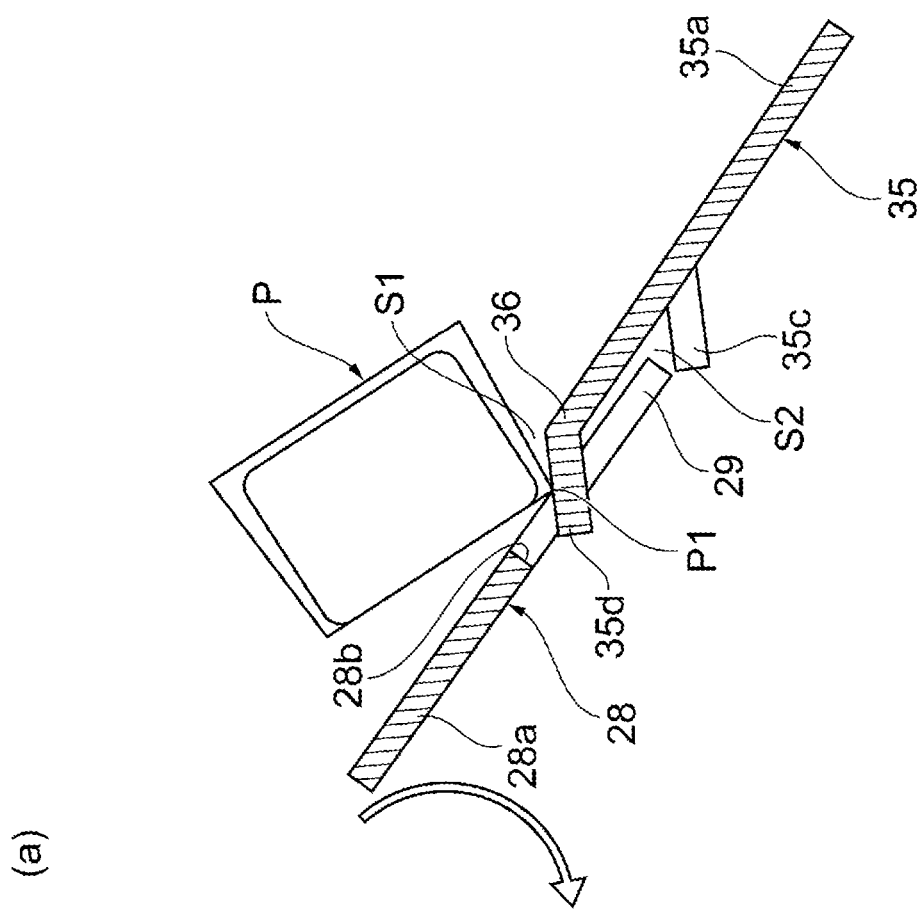

(a) to (b) of FIG. 23 are views showing an embodiment in which the third and fourth guide portions are provided in the movable chute, in which (a) is a side view and (b) is a top view. Note that (a) is a cross-sectional view taken along a line G-G in (b).

(a) to (b) of FIG. 24 are views showing an embodiment in which the third and fourth guide portions are provided in the movable chute, in which (a) is a side view and (b) is a top view. Note that (a) is a cross-sectional view taken along a line H-H in (b).

(a) to (b) of FIG. 25 are views showing an embodiment in which the first and second guide portions are provided in the stopper member, in which (a) is a side view and (b) is a top view. Note that (a) is a cross-sectional view taken along a line I-I in (b).

(a) to (b) of FIG. 26 are views showing an embodiment in which the first and second guide portions are provided in the stopper member, in which (a) is a side view and (b) is a top view. Note that (a) is a cross-sectional view taken along a line J-J in (b).

(a) to (c) of FIG. 27 are views (comparative example) showing a process of transferring the tofu from the movable chute to the conveyance device, in which (a) is a view showing a state where the tofu is supported by the movable chute, (b) is a view showing a state where the tofu is inclined on the conveyance device, and (c) is a view showing a state where the tofu rolls over on the conveyance device.

Figure 28:
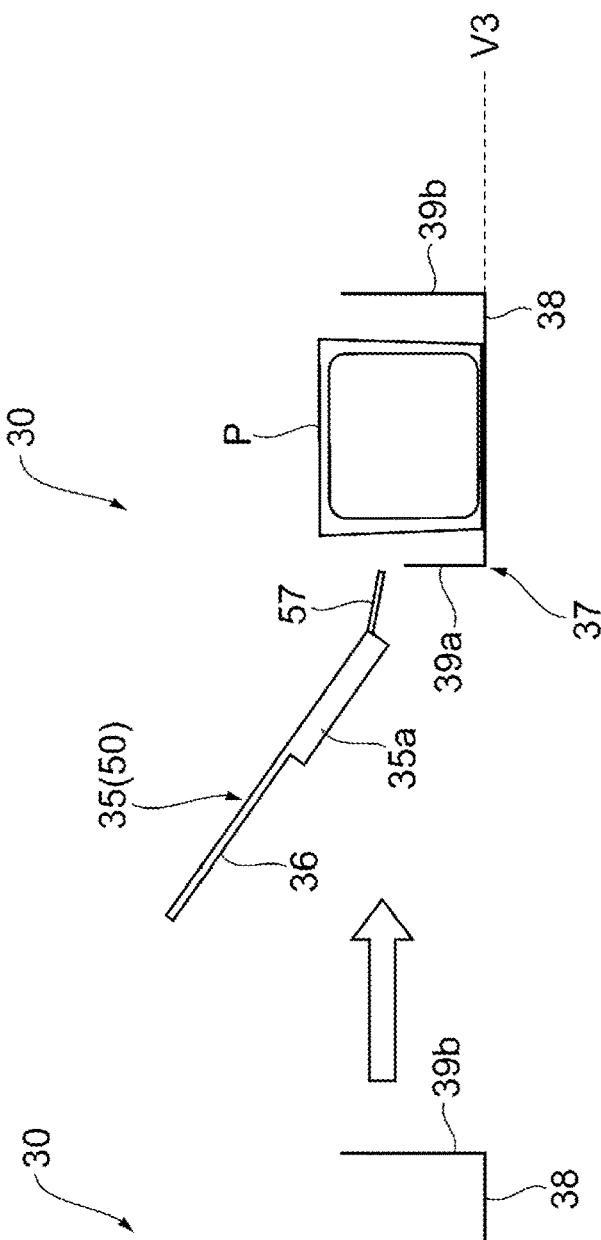

(a) to (b) of FIG. 28 are views showing an embodiment in which a rapid fall prevention member is provided in the movable chute, in which (a) is a view showing a state where the tofu is supported by the movable chute, and (b) is a view showing a state where the tofu is normally supported on the conveyance device.

Figure 29:
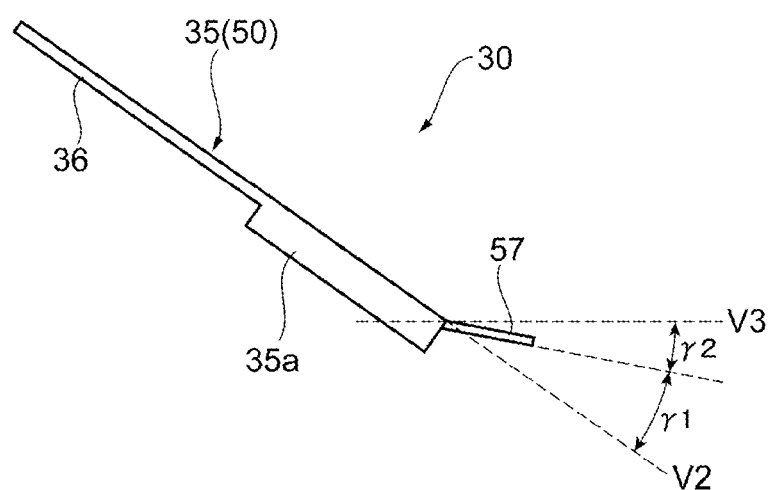

FIG. 29 is a view showing an angle at which the rapid fall prevention member is provided.

In FIG. 30, (a) is a side view of a fixed chute as viewed from a width direction, (b) is a top view of the fixed chute, and (c) is a front view of the fixed chute as viewed from a traveling direction of the tofu.

In FIG. 31, (a) is a side view of a fixed chute as viewed from a width direction, (b) is a top view of the fixed chute, and (c) is a front view of the fixed chute as viewed from the traveling direction of the tofu.

in FIG. 32, (a) is a side view of a fixed chute as viewed from a width direction, (b) is a top view of the fixed chute, and (c) is a front view of the fixed chute as viewed from the traveling direction of the tofu.

In FIG. 33, (a) is a side view of a fixed chute as viewed from a width direction, (b) is a top view of the fixed chute, and (c) is a front view of the fixed chute as viewed from the traveling direction of the tofu.

DESCRIPTION OF EMBODIMENTS

Hereinafter, embodiments of an inversion guide device and a tofu production device according to the present invention will be described in detail with reference to the drawings.

(a) to (b) of FIG. 1 show a tofu production device 1 including an inversion guide device 20 according to a first embodiment. The tofu production device 1 includes a transfer conveyor 10 that conveys tofu covered with a pack P, the inversion guide device 20 that inverts the tofu (pack P), and a tofu receiving device 30 that receives the tofu (pack P) inverted by the inversion guide device 20 and passes the tofu to the next step.

(a) of FIG. 1 is a side view of the tofu production device 1 during use, and (b) of FIG. 1 is a side view of the tofu production device 1 during cleaning or the like. As shown in (b) of FIG. 1, the transfer conveyor 10, the inversion guide device 20, and the tofu receiving device 30 can be separated from each other during cleaning, maintenance, and the like, and are easily attached and detached for maintenance of the tofu production device 1.

Figure 2:
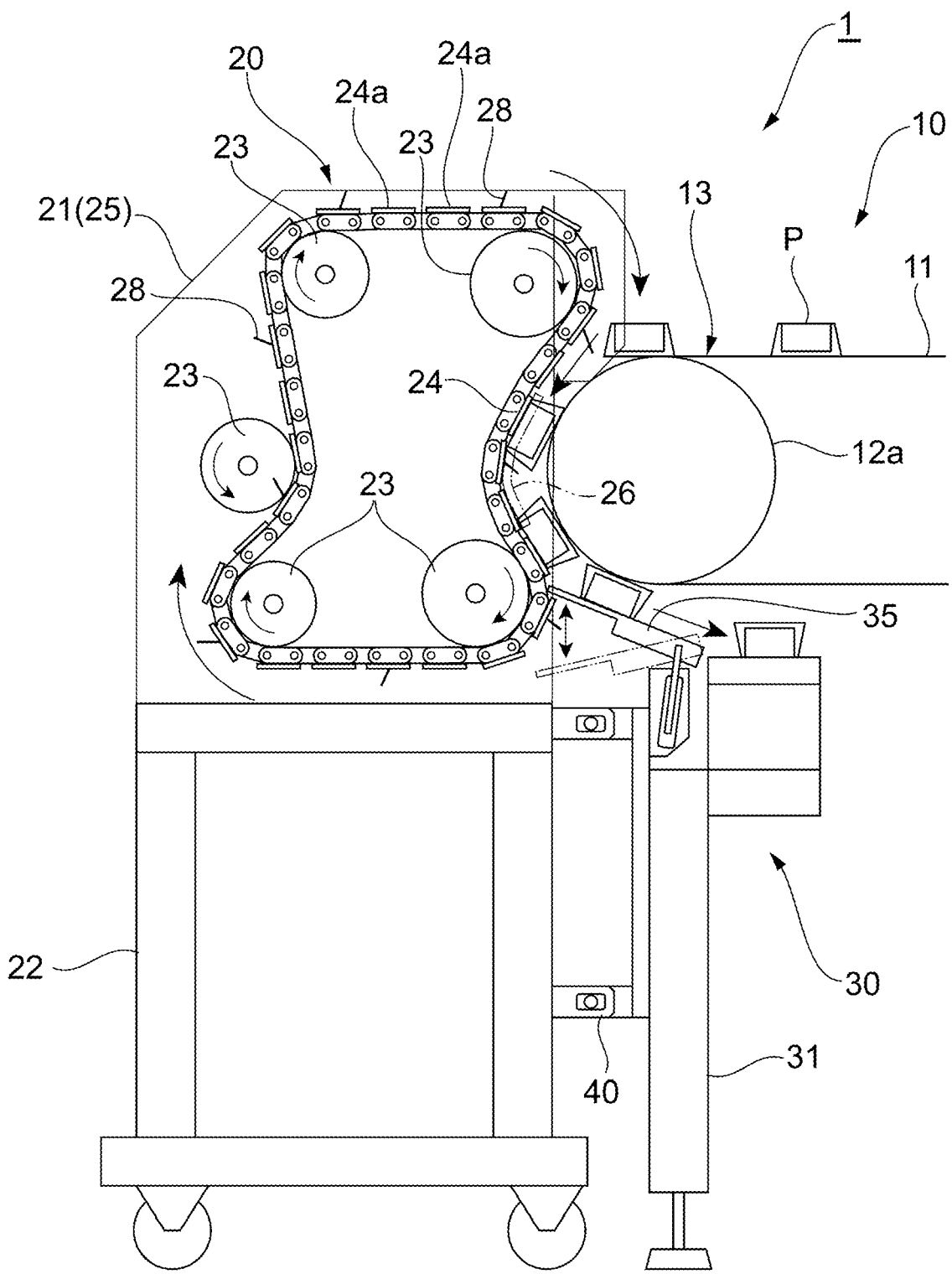
FIG. 2 is a side view of the tofu production device.

FIG. 2 is an enlarged view of the transfer conveyor 10 and the inversion guide device 20 according to the first embodiment shown in (a) to (b) of FIG. 1. In the present embodiment, the transfer conveyor 10 includes a pair of first and second rollers 12a, 12b arranged at both ends in a conveyance direction (left-right direction in (a) of FIG. 1), and an endless belt 11 hung around the first and second rollers 12a, 12b.

Hereinafter, an end portion of the transfer conveyor 10 on a first roller 12a side (left side in (a) of FIG. 1) in the conveyance direction (left-right direction in (a) of FIG. 1) is referred to as "one end of the transfer conveyor 10". The one end of the transfer conveyor 10 is provided with a turn-back portion 13 at which the belt 11 is turned back by the first roller 12a.

A surface of the belt 11 constitutes a conveyance surface 11a that conveys the pack P (tofu covered with the pack P) covering the tofu with an opening facing downward. The transfer conveyor 10 includes, for example, a belt conveyor for food, and is continuously driven or intermittently driven, but a configuration, a driving method, and the like thereof are not particularly limited.

The inversion guide device 20 inverts the pack P such that the opening of the pack P faces upward at the turn-back portion 13 at the one end of the transfer conveyor 10. In the present specification, the tofu covered with the pack P as a container from above is used, but a configuration of the "tofu" is not limited to tofu covered with the pack P, tofu contained in the pack P, bare tofu not covered with the pack P, and the like. In particular, the tofu during inversion at the turn-back portion 13 may be bare tofu. In the present specification, these are collectively referred to as the "tofu".

The tofu receiving device 30 will be described in detail later. The tofu receiving device 30 is a general endless conveyor, and pulls out the tofu in a direction (direction perpendicular to a paper surface of FIG. 2) perpendicular to the conveyance direction of the transfer conveyor 10 (left-right direction in FIG. 2). The tofu receiving device 30 may be a conveyor along the conveyance direction of the transfer conveyor 10 (left-right direction in FIG. 2) or a device that moves and transfers the tofu by an extrusion mechanism or the like, but is not particularly limited.

The inversion guide device 20 guides the tofu conveyed by the conveyance surface 11a of the transfer conveyor 10 and inverted by the turn-back portion 13 at the one end of the transfer conveyor 10. The inversion guide device 20 includes a main body portion 21, a support base 22 that supports the main body portion 21 from below, a plurality of (five in the present embodiment) rotation shafts 23 provided on the main body portion 21, an endless conveyor 24 that is supported and driven by the plurality of rotation shafts 23, and a guide member 26 that guides the endless conveyor 24 in a portion facing the turn-back portion 13 of the transfer conveyor 10.

The main body portion 21 has a box shape, and accommodates the rotation shafts 23 and the endless conveyor 24. The main body portion 21 has an appearance including a plurality of walls. A pair of side walls (a pair of surfaces on a front side and a back side of the drawing) in the plurality of walls of the main body portion 21 function as a rotation shaft support member 25 that rotatably supports the plurality of rotation shafts 23.

The plurality of rotation shafts 23 are supported by the rotation shaft support member 25, and for example, at least one rotation shaft 23 functions as a drive shaft driven by a motor or the like, and the other rotation shafts 23 function as driven shafts driven by the drive shaft.

The endless conveyor 24 driven by the rotation shafts 23 includes, for example, a chain conveyor, a woven belt, a resin belt, a rubber belt slat band chain type conveyor, or the like, and a type thereof is not particularly limited. In a case of a chain conveyor, at least both ends are chains, and the chain conveyor includes a plurality of attachments such as a round bar, a pipe, a square member, a flat plate, and a wire mesh attached between both ends. These members are made of a material such as stainless steel, titanium, or a resin member (including a coating process such as fluorine coating). In the present embodiment, the endless conveyor 24 in which a plurality of plates 24a are provided in a longitudinal direction will be described as an example.

The tofu production device 1 may include a cleaning device (FIG. 16) that cleans inside of the inversion guide device 20 including the endless conveyor 24, the rotation shaft 23, and the like as appropriate to automatically clean the inside of the inversion guide device 20 by cleaning in place (CIP).

The endless conveyor 24 supports the tofu (pack P) along a track of the turn-back portion 13 of the transfer conveyor 10, and guides the tofu while being driven in a circulating manner as indicated by an arrow in synchronization with movement of the transfer conveyor 10. Specifically, a shape of the portion of the endless conveyor 24 facing the turn-back portion 13 (the first roller 12a) is substantially parallel to an outer peripheral surface of the first roller 12a due to the guide member 26 that guides the endless conveyor 24.

The guide member 26 is formed of a plate material curved along a path along which the tofu (pack P) moves, and is provided at each of both ends of the endless conveyor 24 in a width direction (a depth direction of the paper surface of FIG. 2).

The guide member 26 may guide vicinity of a center of each of the plurality of plates 24a. The guide member 26 may be a curved plate, an angle, or a small sprocket arranged in a curved shape. Although a part of the guide member 26 is not shown in the following embodiments, the guide member 26 is provided in the same manner.

Therefore, in a region where the endless conveyor 24 and the first roller 12a face each other, a distance between the endless conveyor 24 and the first roller 12a is substantially constant. The distance is substantially equal to a vertical dimension of the pack P (a distance from an upper surface to a bottom surface). Therefore, the endless conveyor 24 guides and inverts the tofu (pack P) while sandwiching the tofu with the first roller 12a of the transfer conveyor 10 while keeping the tofu (pack P) along a curved surface of the first roller 12a of the turn-back portion 13 or pressing the tofu (pack P) so as to be in contact with the curved surface of the first roller 12a.

Figure 3:
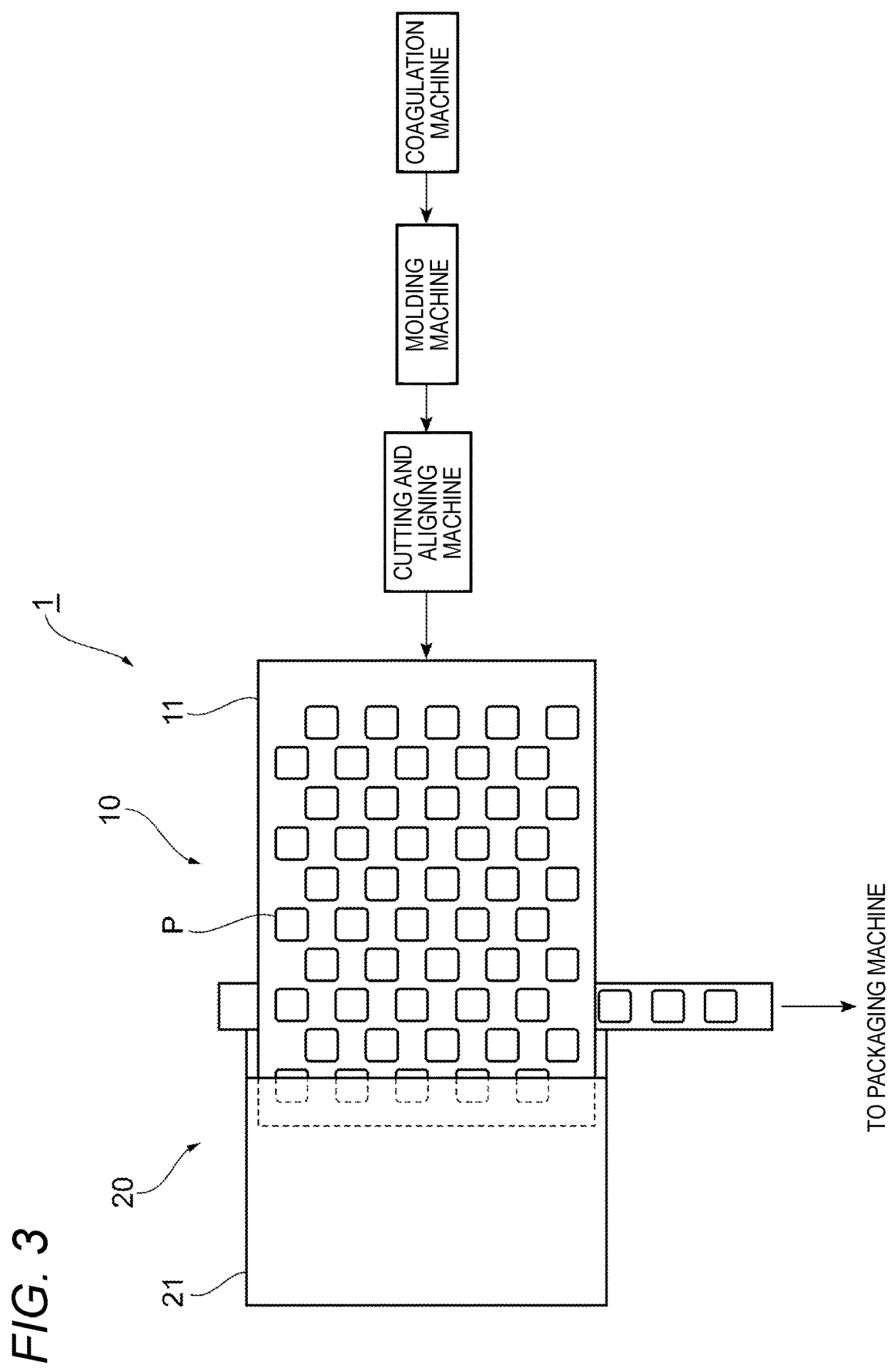
FIG. 3 is a top view of the tofu production device.

FIG. 3 shows an upper surface of the tofu production device 1 including the preceding steps shown by blocks. The packs P (the tofu covered with the packs P) filled with the tofu formed through operations by a coagulation machine, a molding machine, and a cutting and aligning machine are continuously supplied in alignment on the transfer conveyor 10 at intervals. Normal products other than defective products of the pack P (the tofu) inverted by the inversion guide device 20 are sent to a packaging machine.

There are various types and sizes of the tofu or the pack P to be filled with the tofu. In related art, when a type and a size of the tofu or the pack P are changed, it is necessary to replace a guide plate itself arranged on the turn-back portion 13 in a tofu production device, adjust a position of the guide plate, and the like, which leads to deterioration in working efficiency.

The inversion guide device 20 according to the present embodiment is configured such that a distance between the turn-back portion 13 of the transfer conveyor 10 and the endless conveyor 24 can be adjusted. Thereby, a gap between the inversion guide device 20 and the turn-back portion 13 can be adjusted according to factors such as a size of the pack P, a size (a height) of the tofu, softness of the tofu, and ease of catching the tofu, and it is easy to cope with various types of products having different types of packs P, tofu sizes, and the like. The turn-back portion 13 of the transfer conveyor 10 and the endless conveyor 24 may be configured to be attachable and detachable. A specific example will be described below.

(a) to (b) of FIG. 4 show an operation of the inversion guide device 20 according to the first embodiment shown in (a) to (b) of FIG. 1 and FIG. 2. The support base 22 that supports the endless conveyor 24 includes wheels (a trolley with rollers, casters) on a bottom surface, so that the inversion guide device can be easily moved in a front-rear direction (or a left-right direction, not shown). Further, the support base 22 includes a position adjustment unit 40 that adjusts a position of the endless conveyor 24 with respect to the turn-back portion 13 in a horizontal direction. The position adjustment unit 40 is configured in combination with a support 31 of the tofu receiving device 30. The position adjustment unit 40 can be configured by a combination of a slide hole and a slide pin, for example, as in the shown example, implements a state where the inversion guide device 20 and the transfer conveyor 10 in (a) of FIG. 4 are close to each other corresponding to a product of thin tofu (pack P), and implements a state where both of the inversion guide device 20 and the transfer conveyor 10 in (b) of FIG. 4 are separated from each other corresponding to a product of thick tofu (pack P). Thereby, the distance between the turn-back portion 13 of the transfer conveyor 10 and the endless conveyor 24 can be adjusted, and it is possible to easily cope with a change in the size of the tofu (pack P). Further, the position adjustment unit 40 is capable of attaching and detaching the turn-back portion 13 of the transfer conveyor 10 and the endless conveyor 24. However, a specific configuration of the position adjustment unit 40 is not particularly limited.

(a) to (b) of FIG. 5 show an operation of the inversion guide device 20 according to a second embodiment. The inversion guide device 20 further includes the guide member 26 that is arranged between the turn-back portion 13 and the endless conveyor 24 and guides the endless conveyor 24. The guide member 26 is formed of a plate material curved along a path along which the tofu (pack P) moves, and is provided at each of both ends of the endless conveyor 24 in a width direction (a depth direction of a paper surface of (a) to (b) of FIG. 5). Further, a distance adjustment member 27 that adjusts a distance and a track of the endless conveyor 24 with respect to the turn-back portion 13 is attached to the guide member 26. A position of the guide member 26 is changed by driving the distance adjustment member 27, and a distance and a track of the guide member 26 with respect to the turn-back portion 13 are changed, so that a distance between the turn-back portion 13 and the endless conveyor 24 can be adjusted. The distance adjustment member 27 may include, for example, a cylinder, a piston, and the like attached to the pair of side walls functioning as the rotation shaft support member 25. However, a specific configuration of the distance adjustment member 27 is not particularly limited. The guide member 26 may include a plurality of divided members.

(a) to (b) of FIG. 6 show an operation of the inversion guide device 20 according to a third embodiment. In the inversion guide device 20, the rotation shafts 23 of the endless conveyor 24 are supported by the rotation shaft support member 25 in a rotatable and horizontally movable state. In the present embodiment, among the five rotation shafts 23, two rotation shafts 23 (upper left and lower left rotation shafts 23 in the drawing) are fixed drive shafts 23*a*, and three rotation shafts 23 (left, upper right and lower right rotation shafts 23 in the drawing) are driven shafts 23*b*. The driven shaft 23*b* can be appropriately moved in the horizontal direction by a slide hole formed in the rotation shaft support member 25. Thereby, the distance between the turn-back portion 13 of the transfer conveyor 10 and the endless conveyor 24 can be adjusted, and it is possible to easily cope with a change in the size of the tofu (pack P). The number and arrangement of the drive shafts 23*a* and the driven shafts 23*b* are not particularly limited. If at least the rotation shafts 23 arranged near the turn-back portion 13 is movable in the horizontal direction, the distance between the turn-back portion 13 and the endless conveyor 24 can be adjusted.

In the embodiments shown in (a) of FIG. 4 to (b) of FIG. 6, the position of the inversion guide device 20 or the endless conveyor 24 may adjusted manually or automatically. A power source of an automatic operation may be a linear power source such as an air cylinder, a hydraulic cylinder, or an electric cylinder, a crank type combined with the linear power source, or a power source that changes a rotation angle such as a rotary encoder or a servo motor that is directly rotated, and is not particularly limited.

Unlike a related-art plate-shaped guide plate, the inversion guide device 20 according to the present embodiment includes the endless conveyor 24 that is appropriately modified, and the position of the endless conveyor 24 with respect to the turn-back portion 13 can also be appropriately adjusted according to the type, size, and the like of the tofu (pack P). Therefore, a force of the gravity acting on the tofu (pack P) in the turn-back portion 13 can be reduced to prevent the tofu (pack P) from falling.

However, in order to further reduce a possibility of falling, a stopper member 28 that receives the tofu (pack P) at the turn-back portion 13 may be provided in the inversion guide device 20. FIG. 7 shows a specific example of the stopper member 28. FIG. 7 shows a state where the stopper member 28 and a movable chute 35 of the tofu receiving device 30 are facing each other.

The stopper member 28 is attached to, for example, the endless conveyor 24 (see (a) of FIG. 8 to FIG. 12). (a) of FIG. 8 to (d) of FIG. 9 show a configuration in which the stopper member 28 is attached to the plate 24*a* of the endless conveyor 24, but in FIGS. 10 to 12, the drawings are simplified and the plate 24*a* is not shown.

An upper-lower direction in FIG. 7 corresponds to a direction perpendicular to a paper surface of (a) to (b) of FIG. 4. A distal end of the stopper member 28 has a comb-teeth shape in a width direction (the upper-lower direction in FIG. 7). That is, the stopper member 28 includes a first main body portion 28*a* and a plurality of first protrusions 29 formed at a distal end (a right end in the drawing) of the first main body portion 28*a* so as to be arranged side by side at intervals in the width direction.

A distal end of the movable chute 35 facing the stopper member 28 has a comb-teeth shape in the width direction. That is, the movable chute 35 includes a second main body portion 35*a* and a plurality of second protrusions 36 formed at a distal end (a left end in the drawing) of the second main body portion 35*a* so as to be arranged side by side at intervals in the width direction.

The plurality of first protrusions 29 and the plurality of second protrusions 36 are alternately arranged in the width direction (the upper-lower direction in FIG. 7). The first protrusion 29 and the second protrusion 36 adjacent to each other are arranged at intervals in the width direction and do not interfere with each other. There is a gap between a distal end (a right end in the drawing) of the first protrusion 29 and the second main body portion 35*a* of the movable chute 35, and these do not interfere with each other. There is a gap between a distal end (a left end in the drawing) of the second protrusion 36 and the first main body portion 28*a* of the stopper member 28, and these do not interfere with each other. The present invention is not limited to this configuration, and a configuration may be adopted in which the distal end of the flat plate-shaped stopper member 28 and the distal end (a rear end) of the flat plate-shaped movable chute 35 are set at positions that are very close to each other and do not interfere with each other.

(a) to (c) of FIG. 8 are side views of the stopper member 28 provided on the plate 24*a* of the endless conveyor 24 and the movable chute 35 facing the stopper member 28. (a) of FIG. 8 shows an example of a form in which the stopper member 28 is bent at one position, (b) of FIG. 8 shows an example of a form in which the stopper member 28 is bent, and (c) of FIG. 8 shows an example of a form in which the stopper member 28 is bent at two positions. A bent or curved portion of the stopper member 28 may be either one or both of the first main body portion 28*a* and the first protrusion 29. That is, the first main body portion 28*a* may be formed so as to be bent or curved, or the first protrusion 29 may be formed so as to be bent or curved.

As for the stopper member 28, a space (pocket) is generated in a latter half of the inversion of the tofu (pack P) indicated by a k region in FIG. 13, that is, the tofu (pack P) is inclined so as to extend upward from the horizontal direction during the inversion (angles θ, θ0 described later are acute angles of 90° or smaller with respect to a horizontal reference), and the tofu (pack P) is likely to be caught by the stopper member 28, which is not preferable. In the pocket, a bottom corner of the tofu (pack P) is deeply and closely fitted and easily caught, which is likely to cause trouble. For example, in a state shown in (a) to (c) of FIG. 9 described later, the angles θ, θ0 are larger than 90°, and no pocket is formed between the endless conveyor 24 and the stopper member 28, which is preferable. On the other hand, in a state as shown in (d) of FIG. 9, the angle θ is 90° or smaller and a pocket is formed, which is not preferable.

Therefore, it is preferable to set the attachment angle θ of a base portion (first main body portion 28*a*) of the stopper member 28 with respect to a circulating track of the endless conveyor 24 of the inversion guide device 20 to an obtuse angle of 90°<θ<180° (preferably 100°≤θ≤170°, and more preferably 110°≤θ≤150°) such that a gap is formed in vicinity of contact between a corner of the tofu (pack P) and the stopper member 28 (such that the tofu (pack P) and the stopper member 28 do not come into close contact with each other) during the inversion of the tofu (pack P).

The angle θ formed by the base portion (the first main body portion 28a) of the stopper member 28 shown in (a) to (c) of FIG. 8 with respect to the plate 24a of the endless conveyor 24 satisfies the above condition. A base portion of the stopper member 28 extends from the endless conveyor 24 (the plate 24a) so as to form a substantially vertical to obtuse angle, and this angle can be referred to as the angle θ0 of the entire stopper member 28 with respect to the endless conveyor 24 including a bending angle of the first protrusion 29. That is, the stopper member 28 is preferably attached to the endless conveyor 24 at angles θ, 00 inclined with respect to a traveling direction of the endless conveyor 24 with respect to a surface of the endless conveyor 24 at a position where the stopper member 28 is attached. The attachment angle θ0 is also preferably set to an obtuse angle of 90°<θ0<180° (preferably 100°≤θ0≤170°, and more preferably 110°≤θ0≤150°).

The stopper member 28 preferably has a width (for example, 20 mm to 3000 mm) capable of supporting one to dozens of cakes of tofu. A cross section of the stopper member 28 has a bent shape or a curved shape at one or a plurality of positions, for example, as shown in (a) to (c) of FIG. 8. A material of the stopper member 28 may be metal (stainless steel, titanium, aluminum, or the like), resin, rubber, or the like, and the material is a plate material, a square material, a round bar, a cutting material, a molding material, or the like in terms of shape. A plurality of stopper members 28 may be provided at predetermined positions of the endless conveyor 24 according to a type of the tofu and the number of cakes in one row. (a) of FIG. 1 and the like disclose a configuration in which a plurality of stopper members 28 are provided on the endless conveyor at substantially equal intervals.

Next, the tofu receiving device 30 will be described. The tofu receiving device 30 receives the tofu (pack P) inverted by the inversion guide device 20, and sends the tofu to the next step (for example, the packaging machine in FIG. 3). The tofu receiving device 30 according to the present embodiment includes a discarding device that does not send all the tofu (packs P) to the next step, but determines whether the tofu is a non-defective product or a defective product by an operator's visual determination or by using a predetermined image inspection system or the like, and discards the defective tofu downward. Unexpectedly generated tofu whose quality, size, and the like are nonstandard is removed as the defective product. However, in a case of a continuous production line, a very small number of nonstandard products always occur at the beginning or the end of production, and therefore, it is necessary to exclude the nonstandard products every day.

Specifically, the discarding device includes the dropout type movable chute 35 that can be easily opened and closed for discarding downward. During normal production, the movable chute 35 is located at a normal position indicated by a solid line in FIG. 2, and moves the tofu (pack P) to the next step. On the other hand, when a defective product arrives, the movable chute 35 is opened downward as shown by a two-dot chain line, and the defective tofu (pack P) is dropped downward and removed. A power source of the movable chute 35 may be a linear power source such as an air cylinder, a hydraulic cylinder, or an electric cylinder, a crank type combined with the linear power source, or a power source that changes a rotation angle such as a rotary encoder or a servo motor that is directly rotated, and is not particularly limited.

As shown in FIG. 7, the distal end of the movable chute 35 has the comb-teeth shape that does not interfere with the first protrusion 29 at the distal end of the stopper member 28. That is, the comb-teeth-shaped unevenness formed by the plurality of second protrusions 36 of the movable chute 35 and the comb-teeth-shaped unevenness formed by the plurality of first protrusions 29 of the stopper member 28 do not interfere with each other (are alternately arranged). Thereby, the stopper member 28 having moved to a position of the movable chute 35 can smoothly send the tofu (pack P) to the tofu receiving device 30 without interfering with the movable chute 35. A discarding screw conveyor, a belt conveyor, or the like may be arranged below the movable chute 35.

As shown in (a) to (b) of FIG. 17 and (a) to (b) of FIG. 18, when the tofu (pack P) is transferred from the stopper member 28 to the movable chute 35, the tofu (pack P) may be lifted obliquely. In this case, depending on a size of the tofu (pack P), a corner P1 of a bottom surface of the tofu (pack P) may be caught by first and second gaps S1, S2 between the unevenness of the distal end of the stopper member 28 and the unevenness of the distal end of the movable chute 35. It is reasonable that a position of the stopper member 28 and the first protrusions 29 when the stopper member 28 and the first protrusions 29 stop is located at a level the same as or above a position of the movable chute 35 and the second protrusions 36, and (a) of FIG. 17 to (b) of FIG. 18 show positions where the stopper member 28 slightly advances downward from an original stop position. That is, (a) of FIG. 17 to (b) of FIG. 18 are extremely illustrated for easy understanding, and are similarly illustrated in (a) of FIG. 17 to (b) of FIG. 23 and (a) of FIG. 25 to (b) of FIG. 26.

Here, the first gap S1 is a gap between a first recess 28b between the pair of adjacent first protrusions 29, 29 of the stopper member 28 and the second protrusion 36 of the movable chute 35 entering the first recess 28b. The second gap S2 is a gap between a second recess 35b between the pair of adjacent second protrusions 36, 36 of the movable chute 35 and the first protrusion 29 of the stopper member 28 entering the second recess 35b.

As shown in (a) to (b) of FIG. 17, the second gap S2 is generated immediately after the first protrusion 29 of the stopper member 28 passes the second recess 35b of the movable chute 35. When the tofu (pack P) obliquely passes, the corner P1 of the bottom surface of the tofu (pack P) enters the second gap S2 and is caught by the second recess 35b of the movable chute 35, which may cause clogging of the tofu (pack P) and trouble.

Similarly, as shown in (a) to (b) of FIG. 18, the first gap S1 is generated immediately after the first recess 28b of the stopper member 28 passes the second protrusion 36 of the movable chute 35. When the tofu (pack P) obliquely passes, the corner P1 of the bottom surface of the tofu (pack P) enters the first gap S1 and is caught by the second protrusion 36 of the movable chute 35, which may cause clogging of the tofu (pack P) and trouble.

In order to prevent the corner P1 of the bottom surface of the tofu (pack P) from entering the second gap S2 as shown in (a) to (b) of FIG. 17, the movable chute 35 may include a third guide portion 35c protruding downward from the second recess 35b (in a rotation direction of the stopper member 28) and bent as shown in (a) to (b) of FIG. 19. The third guide portion 35c has a flat plate shape extending so as to fill at least a part of the second gap S2. However, a shape of the third guide portion 35c is not particularly limited as long as the third guide portion 35c can guide the tofu (pack P) that has entered the second gap S2, and the third guide portion 35c may have a curved shape or the like.

Similarly, in order to prevent the corner P1 of the bottom surface of the tofu (pack P) from entering the second gap S2 as shown in (a) to (b) of FIG. 17, the stopper member 28 may include a first guide portion 28c protruding upward from the distal end of the first protrusion 29 (in a direction opposite to the rotation direction of the stopper member 28) and bent as shown in (a) to (b) of FIG. 20. The first guide portion 28c has a flat plate shape extending so as to fill at least a part of the second gap S2. However, a shape of the first guide portion 28c is not particularly limited as long as the first guide portion 28c can guide the tofu (pack P) that has entered the second gap S2, and the first guide portion 28c may have a curved shape or the like.

By providing the third guide portion 35c ((a) to (b) of FIG. 19) and the first guide portion 28c ((a) to (b) of FIG. 20), when the tofu (pack P) is transferred from the first protrusion 29 of the stopper member 28 to the movable chute 35, the tofu (pack P) is easily transferred smoothly without entering the second gap S2. Even when the corner P1 of the tofu (pack P) is slightly dropped into the second gap S2, the corner P1 is guided by the third guide portion 35c and the first guide portion 28c, so that the corner P1 is not caught by the second recess 35b of the movable chute 35, and trouble can be avoided.

A configuration may be adopted in which the third guide portion 35c ((a) to (b) of FIG. 19) is provided in the movable chute 35, and the first guide portion 28c ((a) to (b) of FIG. 20) is provided in the stopper member 28 (not shown).

In order to prevent the corner P1 of the bottom surface of the tofu (pack P) from entering the first gap S1 as shown in (a) to (b) of FIG. 18, the movable chute 35 may include a fourth guide portion 35d protruding downward from the distal end of the second protrusion 36 (in the rotation direction of the stopper member 28) and bent as shown in (a) to (b) of FIG. 21. The fourth guide portion 35d has a flat plate shape extending so as to fill at least a part of the first gap S1. However, a shape of the fourth guide portion 35d is not particularly limited as long as the fourth guide portion 35d can guide the tofu (pack P) that has entered the first gap S1, and the fourth guide portion 35d may have a curved shape or the like.

Similarly, in order to prevent the corner P1 of the bottom surface of the tofu (pack P) from entering the first gap S1 as shown in (a) to (b) of FIG. 18, the stopper member 28 may include a second guide portion 28d protruding upward from the first recess 28b (in the direction opposite to the rotation direction of the stopper member 28) and bent as shown in (a) to (b) of FIG. 22. The second guide portion 28d has a flat plate shape extending so as to fill at least a part of the first gap S1. However, a shape of the second guide portion 28d is not particularly limited as long as the second guide portion 28d can guide the tofu (pack P) that has entered the first gap S1, and the second guide portion 28d may have a curved shape or the like.

A configuration may be adopted in which the fourth guide portion 35d ((a) to (b) of FIG. 21) is provided in the movable chute 35, and the second guide portion 28d ((a) to (b) of FIG. 22) is provided in the stopper member 28 (not shown).

By providing the fourth guide portion 35d ((a) to (b) of FIG. 21) and the second guide portion 28d ((a) to (b) of FIG. 22), when the tofu (pack P) is transferred from the stopper member 28 to the second protrusion 36 of the movable chute 35, the tofu (pack P) is easily transferred smoothly without entering the first gap S1. Even when the corner P1 of the tofu (pack P) is slightly dropped into the first gap S1, the corner P1 is guided by the fourth guide portion 35d and the second guide portion 28d, so that the corner portion P1 is not caught by the second protrusion 36 of the movable chute 35, and trouble can be avoided.

As shown in (a) to (b) of FIG. 23, the movable chute 35 may include both the third guide portion 35c and the fourth guide portion 35d.

In this case, as shown in (a) to (b) of FIG. 24, a virtual plane obtained by extending the second main body portion 35a of the movable chute 35 in a longitudinal direction (direction in which the second protrusion 36 extends toward the stopper member 28) is referred to as a first reference plane V1. An angle formed by the third guide portion 35c downward with respect to the first reference plane V1 is referred to as $\beta 1$, and an angle formed by the fourth guide portion 35d downward with respect to the first reference plane V1 is referred to as $\beta 2$.

At this time, the angle ($\beta 1$ preferably satisfies $-60° \le \beta 1 \le 0°$, and more preferably satisfies $-30° \le \beta 1 \le 0°$. The angle $\beta 2$ preferably satisfies $-60° \le \beta 2 \le 0°$, and more preferably satisfies $-30° \le \beta 2 \le 0°$. When the angles $\beta 1$, $\beta 2$ satisfy the above relationship, the distal end of the movable chute 35 of the tofu receiving device 30 facing the stopper member 28 has an angle inclined with respect to the traveling direction of the endless conveyor 24 (direction of an arrow in the drawing, downward), and thus the tofu (pack P) can be more reliably prevented from being caught in the first and second gaps S1, S2. When the angles $\beta 1$, $\beta 2$ are smaller than $-60°$ or smaller than $-30°$, the third guide portion 35c and the fourth guide portion 35d are configured to be directed upward from a horizontal plane and received by the protrusion with respect to (a bottom corner of) the pack P sliding down along the first reference plane V1, and thus the pack P is easily caught. When the angles $\beta 1$, $\beta 2$ are larger than $0°$, the third guide portion 35c and the fourth guide portion 35d are configured to be folded back upward with respect to the first reference plane V1, and to be provided with protrusions for (the bottom corner of) the tofu pack P sliding down along the first reference plane V1, so that the tofu pack P is easily caught. In this way, the third guide portion 35c and the fourth guide portion 35d are preferably parallel to the horizontal plane or downward from the horizontal plane.

As shown in (a) to (b) of FIG. 25, the stopper member 28 may include both the first guide portion 28c and the second guide portion 28d.

In this case, as shown in (a) to (b) of FIG. 26, an angle formed by the first guide portion 28c upward with respect to the first reference plane V1 of the movable chute 35 is referred to as a1, and an angle formed by the second guide portion 28d upward with respect to the first reference plane V1 is referred to as $\alpha 2$.

At this time, the angle $\alpha 1$ preferably satisfies $0° \le \alpha 1 \le 60°$, and more preferably satisfies $0° \le \alpha 1 \le 30°$. The angle $\alpha 2$ preferably satisfies $0° \le \alpha 2 \le 60°$, and more preferably satisfies $0° \le \alpha 2 \le 30°$. When the angles $\alpha 1$, $\alpha 2$ satisfy the above relationship, the distal end of the stopper member 28 has an angle inclined with respect to a direction (upward) opposite to the traveling direction of the endless conveyor 24 (direction of an arrow in the drawing), and the tofu (pack P) can be more reliably prevented from being caught by the first and second gaps S1, S2. When the angles $\alpha 1$, $\alpha 2$ are larger than $60°$ or larger than $30°$, the first guide portion 28c and the second guide portion 28d are upward from the horizontal plane with respect to (the bottom corner of) the pack P sliding down along the first reference plane V1, and the pack P is likely to be flipped up. When the angles α1, α2 are smaller than 0°, the first guide portion 28c and the second guide portion 28d are configured to be folded back downward with respect to the first reference plane V1, and the first guide portion 28c and the second guide portion 28d do not play any role for (the bottom corner of) the tofu pack P sliding down along the first reference plane V1. In this way, the first guide portion 28c and the second guide portion 28d are preferably parallel to the horizontal plane or downward from the horizontal plane.

Any one of the first to fourth guide portions 28c, 28d, 35c, 35d may be provided, only one of the first to fourth guide portions 28c, 28d, 35c, 35d may be provided, or all of the first to fourth guide portions 28c, 28d, 35c, 35d may be provided.

The present invention may be configured such that the distal end of the stopper member 28 and the distal end of the movable chute 35 are close to each other so as not to interfere with each other, and in this case as well, the angles α1, α2, β1, β2 preferably satisfy the above relationships.

(a) to (d) of FIG. 9 are views showing the stopper member 28 from a side (different from FIG. 7 and (a) to (c) of FIG. 8, the first protrusion 29 is not shown regardless of presence or absence of the first protrusion 29), and show side views of various modifications of the overall configuration of the stopper member 28. (a) of FIG. 9 shows an example of the stopper member 28 having a mountain shape in a side view, (b) of FIG. 9 shows an example of the stopper member 28 having a bent shape in a side view, (c) of FIG. 9 shows an example of the stopper member 28 having a curved shape in a side view, and (d) of FIG. 9 shows a comparative example of the stopper member 28 having a linear shape in a side view. In (a) to (c) of FIG. 9, the attachment angles θ, 00 of the stopper member 28 with respect to the endless conveyor 24 (plate 24a) are obtuse angles satisfying 90°<θ<180°, but in (d) of FIG. 9, the attachment angle θ is an acute angle of 90° or smaller, and the tofu (pack P) is easily caught.

FIGS. 10 to 13 are conceptual views of processes of inverting the tofu using the stopper members 28 shown in (a) to (d) of FIG. 9. That is, FIG. 10 shows a conceptual view of a process using the stopper member 28 in (a) of FIG. 9, FIG. 11 shows a conceptual view of a process using the stopper member 28 in (b) of FIG. 9, FIG. 12 shows a conceptual view of a process using the stopper member 28 in (c) of FIG. 9, and FIG. 13 shows a conceptual view of a process using the stopper member 28 in (d) of FIG. 9.

In the processes of FIGS. 10 to 12, smooth inversion of the tofu is expected. On the other hand, in the process of FIG. 13, as described above, since the attachment angle θ is an acute angle of 90° or smaller, a pocket formed by the endless conveyor 24 and the stopper member 28 is likely to occur in the latter half of the inversion in a portion indicated by the k region, and a phenomenon occurs in which a corner of the tofu comes into close contact with the pocket and the tofu is caught, which may cause clogging trouble of the tofu.

(a) to (c) of FIG. 14 are views showing various modifications of the movable chute 35. The movable chute 35 according to the embodiment is a plate-shaped member, and functions as a discarding unit that removes defective tofu (pack P) and discards the tofu without flowing to the next step (packaging machine or the like). Each of (a) of FIG. 14 to (c) of FIG. 14 shows a state of the movable chute 35 when the tofu (pack P) is carried to the next step on a left side, and a state of the movable chute 35 when the tofu (pack P) is discarded as a defective product on a right side.

The movable chute 35 in (a) of FIG. 14 is of a manual operation type in which the operator operates a lever or the like (not shown) outside a spring 35e to move the spring 35e at any timing. The movable chute 35 in (b) of FIG. 14 is of a cylinder operation type operated by a cylinder member such as an air cylinder 35f. The movable chute 35 of (c) of FIG. 14 is of a motor operation type operated by a motor 35g.

In a case of the type shown in (a) of FIG. 14, a passive operation of opening and closing by an own weight of a double-layered tofu or the like by a spring may be adopted. A passive operation in which the spring is replaced with a damper (air damper) or the like may be performed, and similarly to the spring, an effect of temporarily receiving the falling tofu by a cushion can also be used.

In a case of the types shown in (b) of FIG. 14 and (c) of FIG. 14, it is preferable to perform a so-called active operation in which the operator intentionally operates the tofu by a switch operation, operates the tofu with a timer setting so as to discharge the tofu for a certain period of time at the start or end of production of the tofu, or automatically operates the tofu by detecting clogging of the tofu with a sensor. The term "defective tofu" refers to tofu having poor quality, tofu whose size and weight are nonstandard, tofu that cannot be covered well with a pack, or the like.

The tofu receiving device 30 having a discarding function may include a fixed chute 50 (discarding unit) having openings 53 as shown in (a) of FIG. 30 to (c) of FIG. 32, instead of the plate-shaped movable chute 35 (discarding unit). That is, the fixed chute 50 is a discharge member formed of a plate material having a hole, or a discharge member in which a plurality of round bars, square materials, or plate materials are fixedly arranged at intervals.

The fixed chute 50 shown in (a) to (c) of FIG. 30 includes a plate-shaped member 51 and a plurality of (twelve in the present embodiment) openings 53 formed in the plate-shaped member 51 at intervals in a width direction of the fixed chute 50 (direction perpendicular to the traveling direction of the tofu). The opening 53 has a long hole shape elongated in the traveling direction of the tofu. A width 53L of the opening 53 is smaller than a width of the tofu (pack P) and is about 1 mm to 50 mm. Coupling members 55 that couples both sides of the plate-shaped member 51 in the traveling direction of the tofu are provided between the adjacent openings 53. The plate-shaped member 51 and the coupling members 55 are integrally formed.

(a) of FIG. 30 shows a state in which the tofu covered with the pack P is conveyed on the fixed chute 50. In this way, since the tofu is protected by being covered with the pack P, even when the tofu passes over the opening 53 while being supported by the plurality of coupling members 55, the tofu does not collapse due to an own weight thereof and is not discarded.

On the other hand, as shown in (a) of FIG. 31 and (a) of FIG. 32, the tofu to be discarded, which is generated at the beginning or the end of the continuous production, is not covered with the pack P, and when the tofu is supported by the plurality of coupling members 55, the tofu collapses due to a force of falling and an own weight thereof, and is discharged downward from the plurality of openings 53. Therefore, a special operation for removing the tofu is not required, which is very simple.

In the fixed chute 50 in (a) to (c) of FIG. 31 and (a) to (c) of FIG. 32, the plate-shaped member 51 and the coupling members 55 are separate bodies. That is, the coupling member 55 is a plurality of thin round bars or a square material, each of which is a member separate from the plate-shaped member 51. The plurality of coupling members 55 are fixed to the plate-shaped member 51 by any means such as an adhesive or welding. According to such a fixed chute 50, when the bare tofu not covered with the pack P is supported by the plurality of coupling members 55, the tofu collapses due to the own weight thereof and is discharged downward from the plurality of openings 53. As in a case of the coupling members 55 shown in (a) to (c) of FIG. 32, when the tofu has a shape that protrudes most in an upper-lower direction at a center in the traveling direction of the tofu, the tofu can be smoothly crushed. A shape of the coupling member 55 is not particularly limited as long as it is a shape having a high effect of crushing the tofu, such as a saw blade shape, an uneven shape, a thin sharp blade shape, or a thin sharp needle shape.

When the fixed chute 50 does not need a discarding function, a fixed chute 50 in which the plate-shaped member 51 does not have the opening 53 as shown in (a) to (c) of FIG. 33 may be used.

As shown in (a) to (c) of FIG. 27, the tofu receiving device 30 includes the movable chute 35 (fixed chute 50) and a conveyance device 37 that conveys the tofu (pack P) conveyed by the movable chute 35 to the next step.

The conveyance device 37 may be a device that moves and transfers the tofu by a conveyor, an extrusion mechanism, or the like, and is not particularly limited.

The conveyance device 37 has a bottom surface 38, and a first surface 39a and a second surface 39b extending upward from both sides of the bottom surface 38 in the traveling direction of the tofu (pack P). The first surface 39a is a surface closer to the movable chute 35, and the second surface 39b is a surface farther from the movable chute 35.

The bottom surface 38 and an upper end of the first surface 39a are located below the movable chute 35, and the tofu (pack P) can be delivered from the movable chute 35. An upper end of the second surface 39b is located above the upper end of the first surface 39a, and prevents the tofu (pack P) delivered from the movable chute 35 from being separated from the conveyance device 37 due to a force of delivery.

As shown in (a) to (c) of FIG. 27, when the tofu (pack P) is large in size and heavy in weight, the tofu gains momentum as being transferred from the movable chute 35 to the conveyance device 37, and the tofu may be inclined obliquely ((b) of FIG. 27) or roll over ((c) of FIG. 27) on the conveyance device 37, which may cause trouble such as clogging in a subsequent step when the tofu is conveyed in this state.

Therefore, it is preferable that the tofu receiving device 30 (movable chute 35) includes a rapid fall prevention member 57 provided on an outlet side of the tofu receiving device 30 (movable chute 35) and bent or curved upward relative to a downward gradient of the tofu receiving device 30 (movable chute 35). That is, as shown in (a) to (b) of FIG. 28, it is preferable to provide a rapid fall prevention member 57 between the movable chute 35 and the conveyance device 37. The rapid fall prevention member 57 according to the present embodiment is a plate-shaped member provided on the second main body portion 35a of the movable chute 35, but may be a member provided on the first surface 39a of the conveyance device 37, or may be a member supported by a support member (not shown) other than the movable chute 35 and the conveyance device 37.

By providing such a rapid fall prevention member 57, it is possible to reduce a speed of transfer from the movable chute 35 to the conveyance device 37 even with large and heavy tofu (pack P), prevent the tofu from being inclined obliquely ((b) of FIG. 27) or rolling over ((c) of FIG. 27) on the conveyance device, and prevent trouble from occurring in the subsequent step.

As shown in FIG. 29, it is preferable that the rapid fall prevention member 57 has a gentler gradient than the downward gradient of the movable chute 35, and a distal end of the rapid fall prevention member 57 is bent upward. A virtual plane obtained by extending the movable chute 35 in a longitudinal direction (traveling direction of the tofu (pack P)) is referred to as a second reference plane V2, a virtual plane obtained by extending the bottom surface 38 of the conveyance device 37 is referred to as a third reference plane V3 (horizontal plane), an angle formed by the rapid fall prevention member 57 upward with respect to the second reference plane V2 is referred to as $\gamma 1$, and an angle formed by the rapid fall prevention member 57 downward or upward with respect to the third reference plane V3 is referred to as $\gamma 2$.

In this case, the angle $\gamma 1$ preferably satisfies $0 < \gamma 1 \leq 60°$, and more preferably satisfies $0 < \gamma 1 \leq 30°$. The angle $\gamma 2$ preferably satisfies $-60° \leq \gamma 2 \leq 60°$, and more preferably satisfies $-30° \leq \gamma 2 \leq 30°$. When the angle $\gamma 1$ is larger than 60°, (a bottom corner of) the pack P sliding down along the second reference plane V2 is likely to be largely flipped up, and the tofu is likely to be broken. Even when the angle $\gamma 1$ is smaller than 0°, the rapid fall prevention member 57 is configured to be folded back downward with respect to the second reference plane V2, and does not play any role for (the bottom corner of) the tofu pack P sliding down along the second reference plane V2. When the angle $\gamma 2$ is larger than 60°, (the bottom corner of) the pack P sliding down along the second reference plane V2 is caught by the rapid fall prevention member 57, and the tofu pack P is likely to be clogged. When the angle $\gamma 2$ is smaller than −60° or smaller than −30°, the rapid fall prevention member 57 is configured to have little rapid fall prevention effect with respect to the second reference plane V2, and does not play any role for (the bottom corner of) the tofu pack P sliding down along the second reference plane V2.

By providing the rapid fall prevention member 57 as described above, a vector of a falling inertial force of the tofu acting obliquely downward is corrected to a downward gradient close to a horizontal direction, or a horizontal direction, or slightly upward from the horizontal direction, thereby allowing soft landing of the tofu (pack P) to the conveyance device 37. A drop between the movable chute 35 and the bottom surface 38 of the conveyance device 37 is preferably small. If the rapid fall prevention member 57 is folded back too much upward ($0° < \gamma 2 < 90°$), the tofu (pack P) may be caught as being transferred from the movable chute 35 to the conveyance device 37, or the tofu (pack P) may jump up and fall down when being transferred to the next step, which is not preferable.

As shown in FIG. 15, it is preferable that the endless conveyor 24 is synchronized with the transfer conveyor 10. Basically, when a speed of the endless conveyor 24 is Va, a speed of the transfer conveyor 10 is Vb, a stopper pitch that is a pitch of the stopper members 28 is a, and a front-back pitch of the tofu on the transfer conveyor 10 is b, for example, adjustment is performed such that a=b and Va=Vb.

In general, even if a≠b, the speed Va of the endless conveyor 24 may be larger than the conveyor speed Vb of the turn-back portion 13 of the transfer conveyor 10 (Va>Vb), in which case adjustment is performed such that n a/Va=b/Vb (n: natural number) is satisfied. When Va is increased (the speed of the endless conveyor 24 is high), a centrifugal force can be increased accordingly, so that a force of sticking the tofu to an endless conveyor 24 side acts, and a floating posture of the tofu during inversion can be made more stable and smooth in some cases.

Further, as shown in FIG. 16, a configuration may be adopted in which the inversion guide device 20 is surrounded by a cover (chamber) 150, and inside thereof is provided with a cleaning nozzle that sprays a cleaning liquid or a steam nozzle 151 that injects high-temperature steam for sterilization. CIP cleaning can also be performed automatically, for example, by spraying an alkaline detergent, an acidic detergent, hot water, or the like while moving the endless conveyor 24 to clean or rinse the inside. During production, an inside of a container can be kept at 60° C. to 100° C. by steam blowing, or hot water of 60° C. to 100° C. is applied to a receiving tray at a lower portion and is allowed to pass through the endless conveyor while circulating the endless conveyor, thereby preventing proliferation of various bacteria and preventing secondary contamination of various bacteria.

In the tofu production device including the turn-back portion 13, the inversion guide device according to the present embodiment can cope with various types of tofu with little trouble, little waste loss, and can be efficiently and stably operated. Therefore, it is possible to produce tofu or pack tofu with high efficiency, and obtain high processing capacity. The tofu conveyed in alignment in a plurality of rows and columns by the transfer conveyor can be simultaneously inverted one row at a time, so that mass production can be achieved. In a related-art natural drop inversion method, falling timings of the tofu transferred one after another do not coincide with each other, and trouble is likely to occur. Since the transfer conveyor and the inversion guide device have a linear layout and are wide, an inversion speed can be made relatively slow, and the soft tofu can be prevented from collapsing.

The inversion guide device and the conveyor used in the previous step are configured to be easily separated from each other, and inside of the inversion guide device can be easily maintained and cleaned. Further, by driving the movable chute constituting the discarding device of the tofu receiving device used in the subsequent step, the tofu or the pack can be easily discharged, and the defective tofu or pack generated for some reason (for example, nonstandard tofu or pack that always occurs in a small amount at the beginning or the end in a continuous line) can be easily removed.

It should be noted that the present invention is not limited to the embodiments described above, and modifications, improvements, and the like can be made as appropriate. In addition, materials, shapes, sizes, numerical values, forms, numbers, arrangement positions, and the like of components in the embodiments described above are optional and are not limited as long as the present invention can be achieved.

The present application is based on a Japanese patent application filed on Feb. 25, 2020 (Japanese Patent Application No. 2020-029789) and a Japanese patent application filed on Feb. 3, 2021 (Japanese Patent Application No. 2021-015922), and the contents thereof are incorporated herein as reference.

REFERENCE SIGNS LIST

1 tofu production device
10 transfer conveyor
11 belt
11 a conveyance surface
12a, 12b roller
13 turn-back portion
20 inversion guide device
21 main body portion
22 support base
23 rotation shaft
24 endless conveyor
24a plate
25 rotation shaft support member
26 guide member
27 distance adjustment member
28 stopper member
28a first main body portion
28b first recess
28c first guide portion
28d second guide portion
29 first protrusion
30 tofu receiving device
31 support
35 movable chute (discarding unit)
35a second main body portion
35b second recess
35c third guide portion
35d fourth guide portion
36 second protrusion
37 conveyance device
38 bottom surface
39a first surface
39b second surface
40 position adjustment unit
50 fixed chute (discarding unit)
51 plate-shaped member
53 opening
53L width
55 coupling member
57 rapid fall prevention member
P pack (tofu)
P1 corner
S1 first gap
S2 second gap
V1 first reference plane
V2 second reference plane
V3 third reference plane
$\theta$, $\alpha 1$, $\alpha 2$, $\beta 1$, $\beta 2$, $\gamma 1$, $\gamma 2$ angle

The invention claimed is:

1. An inversion guide device configured to guide tofu conveyed by a transfer conveyor and inverted by a turn-back portion at one end of the transfer conveyor, the inversion guide device comprising:
    an endless conveyor configured to support the tofu along a track of the turn-back portion and guide the tofu while being driven in a circulating manner; and
    a support base configured to support the endless conveyor,
    wherein a distance between the turn-back portion and the endless conveyor is adjustable, or the turn-back portion and the endless conveyor are attachable to and detachable from each other, and
    wherein the support base comprises a position adjustment unit configured to adjust a position of the endless conveyor with respect to the turn-back portion in a horizontal direction, or configured to attach and detach the turn-back portion and the endless conveyor to and from each other.

2. A tofu production device comprising:
    a transfer conveyor;
    the inversion guide device according to claim 1; and
    a tofu receiving device configured to receive tofu inverted by the inversion guide device and pass the tofu to a next step.

3. The tofu production device according to claim 2,
wherein the endless conveyor comprises a stopper member configured to receive the tofu moving at the turn-back portion,
wherein a distal end of the stopper member has a comb-teeth shape in a width direction, and
wherein a distal end of the tofu receiving device has a comb-teeth shape that does not interfere with the distal end of the stopper member.

4. The tofu production device according to claim 3,
wherein the distal end of the tofu receiving device facing the stopper member has an angle inclined with respect to a traveling direction of the endless conveyor.

5. The tofu production device according to claim 2, further comprising:
a rapid fall prevention portion provided on an outlet side of the tofu receiving device and bent or curved upward relative to a downward gradient of the tofu receiving device.

6. The tofu production device according to claim 2,
wherein the tofu receiving device comprises a discarding device configured to discard defective tofu downward.

7. The tofu production device according to claim 6,
wherein the discarding device is a movable chute configured to be opened and closed or a fixed chute having an opening.

8. The tofu production device according to claim 6,
wherein the discarding device is a movable chute configured to be opened and closed, and
wherein the movable chute is of an operation type of at least one of a passive operation using a spring or a damper, a manual operation, and an active operation using a cylinder or a motor.

9. The tofu production device according to claim 6,
wherein the discarding device is a fixed chute having an opening, and
wherein the fixed chute is a discharge member formed of a plate material having a hole, or a discharge member in which a plurality of round bars, square materials, or plate materials are fixedly arranged at intervals.

10. The tofu production device according to claim 2,
wherein the endless conveyor is configured to be synchronized with the transfer conveyor.

11. The tofu production device according to claim 2,
wherein the endless conveyor comprises stopper members configured to receive respective cakes of tofu moving at the turn-back portion, and
wherein where Va is a speed of the endless conveyor, Vb is a speed of the transfer conveyor, a is a stopper pitch that is a pitch of the stopper members, and b is a front-back pitch of the cakes of tofu on the transfer conveyor, a=b is satisfied and the speed Va of the endless conveyor and the speed Vb of the turn-back portion of the transfer conveyor are the same (Va=Vb).

12. The tofu production device according to claim 2,
wherein the endless conveyor comprises stopper members configured to receive respective cakes of tofu moving at the turn-back portion, and
wherein where Va is a speed of the endless conveyor, Vb is a speed of the transfer conveyor, a is a stopper pitch that is a pitch of the stopper members, and b is a front-back pitch of the cakes of tofu on the transfer conveyor, when the speed Va of the endless conveyor is larger than the speed Vb of the turn-back portion of the transfer conveyor (Va>Vb), n·a/Va=b/Vb (n: natural number) is satisfied.

13. The tofu production device according to claim 2,
wherein the inversion guide device is surrounded by a cover, and the inversion guide device comprises a cleaning nozzle configured to spray a cleaning liquid or a steam nozzle configured to inject high-temperature steam for sterilization inside the cover.

14. An inversion guide device configured to guide tofu conveyed by a transfer conveyor and inverted by a turn-back portion at one end of the transfer conveyor, the inversion guide device comprising:
an endless conveyor configured to support the tofu along a track of the turn-back portion and guide the tofu while being driven in a circulating manner; and
a guide member arranged between the turn-back portion and the endless conveyor and configured to guide the endless conveyor,
wherein a distance between the turn-back portion and the endless conveyor is adjustable, or the turn-back portion and the endless conveyor are attachable to and detachable from each other, and
wherein the guide member is movable to adjust a distance with respect to the turn-back portion.

15. An inversion guide device configured to guide tofu conveyed by a transfer conveyor and inverted by a turn-back portion at one end of the transfer conveyor, the inversion guide device comprising:
an endless conveyor configured to support the tofu along a track of the turn-back portion and guide the tofu while being driven in a circulating manner; and
a rotation shaft support member configured to rotatably support a rotation shaft of the endless conveyor,
wherein a distance between the turn-back portion and the endless conveyor is adjustable, or the turn-back portion and the endless conveyor are attachable to and detachable from each other, and
wherein the rotation shaft is supported by the rotation shaft support member in a state of being movable in a horizontal direction.

16. An inversion guide device configured to guide tofu conveyed by a transfer conveyor and inverted by a turn-back portion at one end of the transfer conveyor, the inversion guide device comprising:
an endless conveyor configured to support the tofu along a track of the turn-back portion and guide the tofu while being driven in a circulating manner,
wherein the endless conveyor comprises a stopper member configured to receive the tofu moving at the turn-back portion.

17. The inversion guide device according to claim 16,
wherein a base portion of the stopper member is attached to the endless conveyor at an angle inclined with respect to a traveling direction of the endless conveyor.

18. The inversion guide device according to claim 17,
wherein a distal end of the stopper member has an angle inclined with respect to a direction opposite to the traveling direction of the endless conveyor.

19. A tofu production device comprising:
a transfer conveyor;
an inversion guide device configured to guide tofu conveyed by the transfer conveyor and inverted by a turn-back portion at one end of the transfer conveyor, the inversion guide device comprising an endless conveyor configured to support the tofu along a track of the turn-back portion and guide the tofu while being driven in a circulating manner; and a tofu receiving device configured to receive tofu inverted by the inversion guide device and pass the tofu to a next step, wherein the endless conveyor comprises stopper members configured to receive respective cakes of tofu moving at the turn-back portion, and wherein where Va is a speed of the endless conveyor, Vb is a speed of the transfer conveyor, a is a stopper pitch that is a pitch of the stopper members, and b is a front-back pitch of the cakes of tofu on the transfer conveyor, when the speed Va of the endless conveyor is larger than the speed Vb of the turn-back portion of the transfer conveyor (Va>Vb), n·a/Va=b/Vb (n: natural number) is satisfied.

* * * * *